(12) United States Patent
Neuse et al.

(10) Patent No.: US 8,452,862 B2
(45) Date of Patent: May 28, 2013

(54) APPARATUS AND METHOD FOR CAPACITY PLANNING FOR DATA CENTER SERVER CONSOLIDATION AND WORKLOAD REASSIGNMENT

(75) Inventors: Douglas M Neuse, Austin, TX (US); Douglas K Matchett, Austin, TX (US); Chris Walton, Austin, TX (US)

(73) Assignee: CA, Inc., Islandia, NY (US)

( * ) Notice: Subject to any disclaimer, the term of this patent is extended or adjusted under 35 U.S.C. 154(b) by 122 days.

(21) Appl. No.: 12/802,997

(22) Filed: Jun. 17, 2010

(65) Prior Publication Data

US 2011/0029880 A1    Feb. 3, 2011

Related U.S. Application Data

(63) Continuation of application No. 11/525,511, filed on Sep. 22, 2006, now Pat. No. 7,769,843.

(51) Int. Cl.
*G06F 15/173* (2006.01)

(52) U.S. Cl.
USPC .............................. 709/223; 703/22; 370/230

(58) Field of Classification Search
USPC .......................................................... 709/223
See application file for complete search history.

(56) References Cited

U.S. PATENT DOCUMENTS

| | | | |
|---|---|---|---|
| 5,446,885 A | 8/1995 | Moore et al. |
| 5,560,014 A | 9/1996 | Imamura |
| 5,581,760 A | 12/1996 | Atkinson et al. |
| 5,630,127 A | 5/1997 | Moore et al. |
| 5,710,926 A | 1/1998 | Maurer |
| 5,819,007 A | 10/1998 | Elghazzawi |
| 5,875,285 A | 2/1999 | Chang |
| 5,900,870 A | 5/1999 | Malone et al. |
| 5,946,661 A | 8/1999 | Rothschild et al. |
| 5,987,453 A | 11/1999 | Krishna et al. |
| 6,061,675 A | 5/2000 | Wical |
| 6,144,893 A | 11/2000 | Van Der Vegt et al. |
| 6,167,405 A | 12/2000 | Rosensteel, Jr. et al. |
| 6,182,279 B1 | 1/2001 | Buxton |
| 6,195,665 B1 | 2/2001 | Jarett |
| 6,195,794 B1 | 2/2001 | Buxton |
| 6,446,063 B1 | 9/2002 | Chen et al. |
| 6,507,835 B1 | 1/2003 | Amundsen et al. |
| 6,529,901 B1 | 3/2003 | Chaudhuri et al. |
| 6,546,394 B1 | 4/2003 | Chong et al. |
| 6,553,371 B2 | 4/2003 | Gutierrez-Rivas |
| 6,564,113 B1 | 5/2003 | Barto et al. |
| 6,564,204 B1 | 5/2003 | Amundsen et al. |
| 6,604,084 B1 | 8/2003 | Powers et al. |
| 6,615,182 B1 | 9/2003 | Powers et al. |
| 6,615,206 B1 | 9/2003 | Jakobsson et al. |
| 6,618,852 B1 | 9/2003 | van Eikeren et al. |
| 6,643,660 B1 | 11/2003 | Miller et al. |
| 6,694,507 B2 | 2/2004 | Arnold et al. |
| 6,697,799 B1 | 2/2004 | Neal et al. |

(Continued)

*Primary Examiner* — Krista Zele
*Assistant Examiner* — James Forman
(74) *Attorney, Agent, or Firm* — Schultz & Associates, P.C.

(57) ABSTRACT

A server migration tool used to construct data center migration scenarios allowing for a user to rapidly manipulate a large number of input parameters required to describe a transformation from one data center configuration to a new data center configuration. The tool then performs the transformation and allows the user to interact with new data center configuration to understand its performance. A novel parameterization, speed independent service demand (SISD), greatly facilitates scaling performance metrics between different hardware platforms.

12 Claims, 12 Drawing Sheets

U.S. PATENT DOCUMENTS

| | | |
|---|---|---|
| 6,721,754 B1 | 4/2004 | Hurst et al. |
| 6,757,579 B1 | 6/2004 | Pasadyn |
| 6,968,324 B1 * | 11/2005 | Ruffin et al. ............ 705/400 |
| 7,155,462 B1 | 12/2006 | Singh et al. |
| 2001/0044759 A1 | 11/2001 | Kutsumi et al. |
| 2002/0103777 A1 | 8/2002 | Zhang |
| 2002/0129348 A1 | 9/2002 | Kerpan et al. |
| 2002/0169735 A1 | 11/2002 | Kil et al. |
| 2003/0018490 A1 | 1/2003 | Magers et al. |
| 2003/0105768 A1 | 6/2003 | Berkowitz et al. |
| 2003/0120372 A1 | 6/2003 | Ruth et al. |
| 2003/0172054 A1 | 9/2003 | Berkowitz et al. |
| 2003/0182307 A1 | 9/2003 | Chen et al. |
| 2003/0204348 A1 | 10/2003 | Suzuki et al. |
| 2003/0212643 A1 | 11/2003 | Steele et al. |
| 2003/0212701 A1 | 11/2003 | Beavin et al. |
| 2003/0229641 A1 | 12/2003 | Kamath et al. |
| 2003/0233433 A1 | 12/2003 | Halpern |
| 2003/0236585 A1 | 12/2003 | Kao et al. |
| 2004/0044985 A1 | 3/2004 | Kompalli et al. |
| 2004/0059740 A1 | 3/2004 | Hanakawa et al. |
| 2004/0068340 A1 | 4/2004 | Mayberry |
| 2004/0088382 A1 | 5/2004 | Therrien et al. |
| 2004/0093107 A1 | 5/2004 | Good et al. |
| 2004/0098706 A1 | 5/2004 | Khan et al. |
| 2004/0103108 A1 | 5/2004 | Andreev et al. |
| 2004/0117050 A1 | 6/2004 | Oskin et al. |
| 2004/0133595 A1 | 7/2004 | Black |
| 2004/0148587 A1 | 7/2004 | Conrad et al. |
| 2004/0148589 A1 | 7/2004 | Conrad et al. |
| 2004/0153187 A1 | 8/2004 | Knight et al. |
| 2004/0153189 A1 | 8/2004 | Emerson et al. |
| 2004/0199609 A1 | 10/2004 | Papatla et al. |
| 2005/0038848 A1 | 2/2005 | Kaluskar et al. |
| 2006/0025985 A1 * | 2/2006 | Vinberg et al. ............ 703/22 |
| 2006/0085530 A1 | 4/2006 | Garrett |
| 2007/0150526 A1 | 6/2007 | D'Souza et al. |
| 2007/0220071 A1 | 9/2007 | Anzai et al. |
| 2008/0059639 A1 | 3/2008 | Zhang |

* cited by examiner

APPARATUS AND METHOD FOR CAPACITY PLANNING FOR DATA CENTER SERVER CONSOLIDATION AND WORKLOAD REASSIGNMENT

CROSS REFERENCE TO RELATED APPLICATIONS

The present invention claims priority to U.S. patent application Ser. No. 11/525,511 filed on Sep. 22, 2006 and titled: "Apparatus and Method for Capacity Planning for Data Center Server Consolidation and Workload Reassignment."

FIELD OF INVENTION

The present invention relates generally to computer server capacity planning within the field of information technology and more specifically describes a useful tool by which data center managers can reliably estimate and compare performance of server and workload migration scenarios prior to deployment and in production.

BACKGROUND OF THE INVENTION

The performance of large scale production environments is an area of considerable interest as businesses become more diverse and applications become more complex. Data systems must remain reliable and available. Reliability and performance can be a considerable issue in the face of rapid system or application scaling such as would be experienced in a merger of two large corporations or in the implementation of a new server intensive application such as a web media application involving streaming video.

A goal of modern capacity planners is to optimize business applications on very large and complex systems with perhaps thousands of server nodes that are often geographically dispersed. The workloads processed by these applications and the infrastructure in which they execute change over time. New and different users and user behaviors change the level and mix of the workloads. The servers, networks and their configurations change for a variety of business reasons. Capacity planners must determine a) the impact of such anticipated or hypothetical changes, b) when anticipated increases in workload levels will exceed the capacity of the existing infrastructure, and c) what solutions to predicted performance bottlenecks will be most effective. Capacity planners accomplish these goals by measuring the current performance of their business applications, building performance models using those measurements, and using those models to predict how performance will change in response to anticipated or hypothetical changes to the workloads and infrastructure.

Server consolidation is one type of change to the IT infrastructure that occurs with increasing frequency in order to simplify server management, reduce space and power requirements, and other reasons—including simplification and potential improvement of performance management. However, the number of server consolidation options in a modern large IT environment is enormous. IT managers and capacity planners cannot effectively choose among the myriad of server consolidation options by trial and error or rules of thumb. They need the ability to evaluate different server consolidation scenarios rapidly and easily in order to make good choices before implementing those choices. The present invention provides that ability.

In some situations, low performance of a production system may be analyzed. To relieve the situation, a workload reassignment or new equipment may be needed. The planning and implementation of the nature of the equipment to be deployed or the workload reassignment requires assembling a test environment and scaling analysis.

In yet other situations, newer faster equipment may be deployed to replace older slower equipment. For example, server and storage technology are generally replaced every four to five years to take advantage of advances in speed, power and efficiency. In this case the IT capacity manager is required to plan a detailed server consolidation where the workload of a number of servers is consolidated onto a smaller number of servers. In the prior art, this type of system consolidation is also carried out with a test environment.

Referring to FIG. 1, a modern large-scale computer network known as a production environment is depicted. In a production environment, a data center 1 serves as a central repository for distributed applications and data access to other networks. The data center includes a business application server cluster 2, a database server cluster 3 and a web application server cluster 4. The business application server cluster, data server cluster and web application server are interconnected and provide responses to requests for information from external sources such as shown at 11 and 12. Requests for information can come from company intranets such as shown at 5 which support other computer networks. In this example, a single company internet can support an operations network 8, a marketing department network 7 and an execution and financial network 6. Requests for information are derived from applications running on the various networks which generate workloads. Data center 1 in this example also services requests and provides responses through the internet 6 to retail customers 10 and other corporate customers 9.

A general data center server migration situation is shown in FIG. 2A in which a source or base data center configuration 20 is to be changed to a destination data center configuration 30. A set of Z workloads 18 defined as $\{w\}=w_1, w_2, \ldots w_Z$ are arriving at source data center configuration 20 at base arrival rates $AB(\{w\})$ 15 during a base time interval. Workloads 18 are requests for specific computer instructions to be processed by the base data center. For example, the workloads may be generated by a number of interne users simultaneously utilizing their web browsers to view and interact with web content from a particular company's web servers such as viewing catalogs of merchandise, investigating online specifications, placing orders or providing online payments. A destination data center configuration 30 is prescribed to accept workloads 18 at a set of arrival rates $A(\{w\})$ 16 where $A(\{w\})$ 16 is scaled from base arrival rates $AB(\{w\})$ by some scaling factor $G(\{w\})$, where $G(w)=1$ represents the processing of the workloads by the destination data center configuration at the base (original) workload arrival rates.

Source data center configuration 20 comprises a set of N server clusters 25-1, 25-2, . . . 25-N. Furthermore, server cluster 25-1 comprises a set of server nodes 28-1 and similarly, server clusters 25-1, . . . 25-N contain sets of server nodes 28-2, . . . 28-N (not shown). Server clusters 25-1, . . . 25-N functionally operates to service workloads 18 at arrival rates $AB(\{w\})$ 15. The dimension of a server cluster is defined as the number of server nodes in the cluster. Source parameters 22 describe configuration parameters of the source data center configuration 20.

Destination data center configuration 30 comprises a set of M server clusters 35-1, 35-2, . . . 35-M. Server cluster 35-1 comprises a set of server nodes 38-1 and similarly, server clusters 35-2, . . . 35-M contain sets of server nodes 38-2, . . . 38-M (not shown). Server clusters 35-1, . . . 35-M functionally operates to service workloads 18 at arrival rates A({w}) 16. Note that the destination data center configuration 30 may contain a subset of the base server clusters 25-1 . . . 25-M. Furthermore, note that N or M may equal 1 (one) and that the dimension of a given server cluster may equal 1 (one) so that either the source data center configuration 20 or destination data center configuration 30 may contain only one server node. Destination parameters 32 describe the source data center configuration 30.

In FIG. 2B, a server node 50 typical of the server nodes in the source data center configuration 20 or of destination data center configuration 30. Server node 50 comprises a set of central processing units (CPUs) 55 arranged on an appropriate electronics hardware platform (not shown) for executing computational and I/O instructions. The hardware platform accommodates on-board dynamic random-access memory 70 accessible by CPUs 55 for dynamic data storage. Attached to CPUs 55 and contained in server node 50 are a set of disk drives 60 for persistent storage of data and typically comprised of magnetic read-write hard drives. Also attached to CPUs 55 and contained within server node 50 are a set of network interface cards NICs 65 which provide a means by which the CPUs 55 attach to networks.

The CPU dimension of a server cluster (e.g. server cluster 25-1) is the number of distinct CPUs contained in that server cluster. The disk drive dimension and NIC dimension is similarly defined as the number of respective units in a given server cluster.

In migrating from source data center configuration 20 to destination data center configuration 30, a potentially large number of configuration parameters 22 and 32 must be specified or computed. Source parameters 22 are measured and specified typically as a baseline. It is the object of the present invention to greatly simplify the process of manipulating source parameters 22 by utilizing stored configurations in combination with a set of GUI based wizards for easily specifying servers and reassigning workloads to transform source parameters 22 into destination parameters 32. Additionally, workloads 18 may be grown on a number of time intervals so that the performance sensitivity of the destination data center configuration 30 to workload may be plotted as a function of time The term data center is used throughout this document generally to mean any collection of server clusters organized to perform work on a given workload. The data center may be geographically dispersed so that the server clusters may exist in different geographical locations up to a global scale configuration. The term workload reassignment is used to describe a specific type of data center migration scenario in FIG. 2A and where a specified fraction of each workload 18 is removed from source data center server clusters 25-1,25-N and distributed to destination server clusters 35-1, . . . 35-M. Server consolidation typically implies a situation where the number of servers or number of server clusters are smaller in the destination data center configuration than in the source configuration, though the present invention applies equally well when the number of destination servers or clusters is larger. In server consolidation, as defined in this specification, the workloads from selected source server clusters 25-1, . . . 25-N are fully reassigned and distributed to the destination server clusters 35-1, . . . 35-M. The present invention applies more generally to situations whereby the IT manager desires to understand what the performance of a new data center configuration will be relative to his current configuration so as to optimize the new configuration for performance, cost, upgradeability or other feature. The invention will allow the IT manager to investigate a number of data center configuration scenarios to perform such an optimization. The preferred embodiment of the invention provides the capacity to model server consolidation and workload reassignment as well as other situations.

There are a number of products on the market today to aid the performance engineer in the capacity planning process. Current state of the art in capacity planning tools for server consolidation typically include automatic population of baseline (pre-consolidation) models from databases or performance measurement or monitoring tools. In some cases agents must be present on the monitored devices. Additionally, these products offer rudimentary capabilities to move workloads from one or more baseline servers to a new server.

In terms of ease of use, the state-of-the-art remains cumbersome. For example, when modeling workload and hardware changes in the case of dissimilar hardware between the source and destination servers, scaling factors may need to be calculated external to the planning tool and entered by the user. As another example, the display and organization of scenarios to the user is always done in a flat list.

The present invention, a server migration planning tool, addresses the cumbersome nature of current planning tools by providing a comprehensive and intuitive GUI/wizard for creating server consolidation scenarios. The wizard steps users through selecting source servers, identifying and/or creating destination servers, and moving workloads under either a workload reassignment process or server consolidation process. Multiple reassignments may be combined with a single scenario. The present invention provides for flexible grouping of source and destination servers into tiers of similar servers in a tree list view for ease of selection.

The present invention also provides the performance engineer with improved insight by providing for the definition of destination servers within a consolidation scenario to be any combination of existing or hypothetical servers. Furthermore, a server may be both a source and destination for server consolidation or workload reassignment.

In yet another improvement to the art, different workloads or fractions of workloads may be sent to different destinations in a given scenario; the workload reassignments thus made for the given scenario may precede any scenario (except the base configuration) or it may follow any scenario.

In addition to improvements in the ease of use and flexibility of capacity planning tools for server migration, the transformation engine in the present invention for transforming a source data center configuration into a new data center configuration provides for significant improvement. The transformation calculations automatically scale to account for hardware/configuration differences, such as changing to a different model of computer, adding CPU's, or changing device speeds. Furthermore, the calculation of memory utilization after server consolidation is a novel and useful feature of the present invention.

In the preferred embodiment of the present invention, the description and use of a novel parameterization, speed independent service demand (SISD), greatly facilitates scaling performance metrics between different hardware platforms. Ordinarily (without SISD), computer performance models must specify service demands in time units such as seconds, which depend upon the original device speeds. To evaluate what-if scenarios involving changes to device speeds, the model must scale the service demands by the ratios of the old and new device speeds which require the model to remember the speeds of the original devices. Very complex what-if scenarios such as server consolidation require multiple such scalings to be performed carefully. SISD simplifies the calculations of service times in any computer performance model for what-if scenarios involving changes in device speeds or reassignment of work to new devices with different device speeds. This inventive technique has applicability to performance models of any technology, not just computer-related technology, where service times depend upon the speed of the devices being modeled.

SUMMARY OF INVENTION

In one embodiment, the invention is used to create "what if" scenarios to answer business questions related to management or complex production environments, including large scale computer networks.

In one embodiment, the invention collects production data from performance management tools known in the art. Examples of data collection tools include BMC Patrol available from BMC Software of Houston, Tex., HP Openview, available from Hewlett Packard of Palo Alto, Calif., and Tivoli I™, available from IBM of Armonk, N.Y.

The data collected from these data collection tools include server data such as CPU utilization and process queue length, disk data such as busy utilization, average queue length, average read/writes per second and per byte, network data such as bandwidth, network interface card utilization, send/receive bytes per second, network type, latency and duplexing information and memory data such as memory utilization.

On embodiment of the invention then requires that a model or mathematical simulation of the existing computer system be constructed. In this embodiment, the user is required to define the current production environment through use of a library of infrastructure components or by creation of infrastructure components. This environment further requires the user to define one or more workloads used to drive the model to produce a baseline forecast which is used to analyze anticipated future performance of the production environment. Growth rate forecasts can be defined by the user to be constant or variable and the interval can be defined in weeks, months or years.

Once the baseline system has been defined by the user with the invention, "what if" scenarios can be built and tested using a mathematical model. Possible options for use of the invention include, but are not limited to, finding and consolidating underutilized servers, adding CPUs, adding entirely new hardware, upgrading drives and networks, swapping various brands of hardware, changing workloads and moving workloads from one server to another. The "what if" scenarios allow the user to implement changes to the virtual data center without disrupting the production environment. Independent and interdependent changes across time can also be modeled in the production environment.

Yet another embodiment of the invention provides graphical reports which allow the user to evaluate the impact of changes made in the mathematical model to predict changes and reactions in the larger production system.

BRIEF DESCRIPTION OF DRAWINGS

The disclosed inventions will be described with reference to the accompanying drawings, which show important sample embodiments of the invention and which are incorporated in the specification hereof by reference, wherein.

DETAILED DESCRIPTION OF PREFERRED EMBODIMENTS

Figure 1:
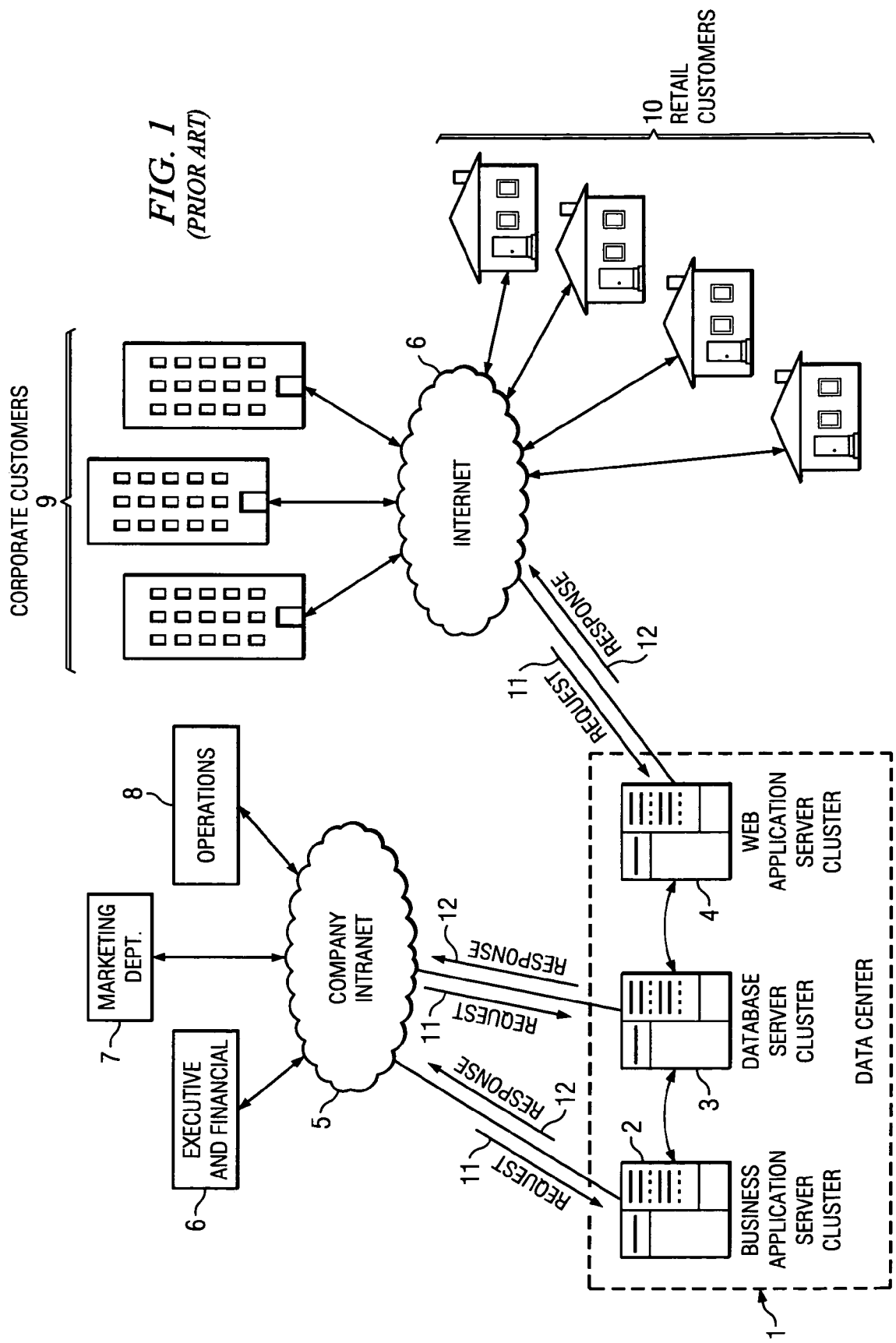
FIG. 1 is a prior art diagram of a data center and applications service network.

The numerous innovative teachings of the present invention will be described with particular reference to the presently preferred embodiment (by way of example, and not of limitation).

In the preferred embodiment of the present invention, apparatus and methods for a server migration tool are used to construct data center migration scenarios. In particular, the server migration tool described in this specification functions to allow a user to rapidly assemble a large number of input parameters required to describe a transformation from one data center configuration to a new data center configuration. The tool then mathematically performs the transformation and allows the user to interact with new data center scenario to understand its performance.

In the following and throughout the remainder of the document, the term 'server' is equivalent to 'server cluster'; 'source' configuration is a general input configuration, while "base" configuration is a specific source configuration that includes measured baseline parameters; 'relocation' configuration is equivalent to 'destination' configuration; workload 'relocation' is equivalent to workload 'reassignment'; variable "t" is a general server subscript; variable "s" is a general source server subscript; variable "d" is a general destination server subscript; variable "k" is a general device subscript; variable "n" is a general network subscript; variable "w" is a general workload subscript; and, variable "p" is a time interval subscript.

Table 1 below includes a list of the input parameters in the preferred embodiment required to specify a data center scenario transformation such as a server consolidation.

Server parameters in Table 1 are comprised of C1 and C2, the total number of servers in the source configuration and the destination configuration, respectively; NAME(t), an ASCII description of server t; SD(t), the dimension of server t, i.e. the number of server nodes in the cluster; PC(t) the CPU count for server t; SV(t,w), the number of visits per workload w on server t; CS(t), the CPU speed rating for server t; UMC(t), the measured pre-relocation CPU utilization on server t; P(t,w), the fraction of server t utilization assigned to workload w; MU(t,g), service rate at server t with g CPUs active (values of g range from 1 to PC(t)); MUMAX(t)=MU(PC(t)). The CPU speed ratings CS(5) may be derived from industry standard benchmarks or other sources. The service rate MU(t,g) is 1 (one) for a single CPU and typically increases as the number of CPUs increase. The value of MU(t,g) is less than g to account for resource contention between chip, cores, and hardware threads, as well as operating system overhead. In exceptionally inefficient configurations, value of MU(g,t) may decrease as g increases. The present invention does not impose any special requirements on the values of MU.

Storage parameters in Table 1 are comprised of D1 and D2, the total number of disks in the source configuration and the destination configuration, respectively; ND(t), the number of disks on server t; DISKS(t), a mapping of servers to disks; DD(k), dimension of disk k which is typically equal to 1 (one); DV(k,w), the device visit count (disk visit count) per workload w at device k; DS(k), the disk speed rating for disk k; UMD(k), the measured pre-relocation disk utilization on disk k; DSVR(k)=t, the mapping from Disk k to the server t to which disk k is attached.

TABLE 1

| Server Parameters | |
|---|---|
| C1 | number of servers in source configuration |
| C2 | number of servers in destination configuration |
| Name(t) | name of server t |
| SD(t) | dimension of server t |
| PC(t) | number of cpu in server t |
| SV(t, w) | server t visit count |
| CS(t) | cpu rating of server t |
| UMC(t) | measured CPU utilization of server t |
| P(t, w) | fraction of server t utilization assigned to w |
| MU(t, g), MUMAX(t) | service rate with g CPUs active, MUMAX = MU(t, PC(t)) |
| Storage Parameters | |
| D1 | number of disks in source configuration |
| D2 | number of disks in destination configuration |
| ND(t) | number of disks on server t |
| DISKS(t) | mapping of all disks on server t |
| DD(k) | dimension of disk k |
| DV(k, w) | visit count to disk k |
| DS(k) | disk k speed rating |
| UMD(k) | measured utilization of disk k |
| DSVR(k) | maps a disk k to the server it is attached |
| NIC Parameters | |
| N1 | number of NICS in source configuration |
| N2 | number of NICS in destination configuration |
| NN(t) | number of NICS on server t |
| NICS(t) | mapping of all NICS on servers t |
| DD(k) | dimension of NIC k |
| DV(k, w) | visit count to NIC k |
| NS(k) | NIC k speed rating |
| UMN(k) | measured utilization of NIC k |
| DSVR(k) | maps a NIC k to the server it is attached |
| Memory Parameters | |
| MC(t) | memory capacity of server t in GB |
| MCORE(t) | memory consumption of server t inactive |
| MFIXED(t) | fixed memory consumption of applications |
| MDYN(t) | dynamic memory consumption of applications |
| UMM(t) | memory utilization on server t |
| MP(t) | memory usage on server t in GB |
| SFM(s, d) | memory use scaling factor source to destination |
| Workload Parameters | |
| Z | number of workloads |
| p0 | baseline time interval |
| p | time interval index |
| AB(w) | base configuration workload arrival rate |
| G(w, p) | growth in arrival rate for w in interval p |
| Network Parameters | |
| R(k, w) | latency or response time |
| NV(n, w) | the number of messages per job w |
| TS(n) | transmission speed in bits/second |
| SC(n) | number of network streams |
| UDR(n, w) | data rate for workload w on network n bits/second |

NIC parameters in Table 1 are comprised of N1 and N2, the total number of NICs in the source configuration and the destination configuration, respectively; NN(t), the number of NICs on server t; NICS(t), a mapping of servers to NICs; DD(k), dimension of NIC k; DV(k,w), the device visit count (NIC visit count) per workload w at device k; NS(k), the NIC speed rating for NIC k; UMN(k), the measured pre-relocation NIC utilization on NIC k; NSVR(k)=t, the mapping from NIC k to the server t to which NIC k is attached.

Memory parameters in Table 1 are comprised of MC(t), the memory capacity for server t in GB; MCORE(t), memory consumption of server t on an inactive system; MFIXED(t), fixed memory consumption of workload w on server t, i.e. applications are loaded on server t but not active; MDYN(t), dynamic memory usage on server t; UMM(t), memory utilization on server t; MP(t), memory usage in gigabytes (GB) on server t; SFM(s,d), memory use scaling factor between source and destination servers. Note that dynamic memory usage MDYN(t) will increase as the workload arrival rate increases.

Workload parameters in Table 1 are comprised of W, the number of workloads; AB(w), the source arrival rate for workload; a baseline interval p0, which defines the time interval during which the various resource consumptions associated with the source are measured; p, a forecast interval that specifies a time interval in the future relative to the baseline interval p=0; and G(w,p), growth factor for workload w in time interval p. Note that A(w,p) is the calculated destination arrival rate at server t in time interval p and is defined as A(w,p)=G(w,p)*AB(w).

The servers are assumed to be connected via networks. Networks consist of a delay device and a transmission device. These two devices are analogous to devices (CPU, disk, NIC) on a server. Networks are not affected by server consolidation or workload reassignment scenarios. However, network characteristics can be altered in a general configuration scenario. Network parameters are comprised of: the latency (or response time) of a network device k, R(,w) for a single network message; the number of messages per job, NV(n,w); the transmission speed in bits/second (or some multiple thereof, such as megabits/second), TS(n); the number of network streams, SC(n); and, the data rate used for workload w on network n (also in bits/second), UDR(n,w). A network delay is modeled as two parts; a latency delay and a transmission queue. The transmission queue has parameters much like a disk, including measured utilization and speed rating. A network visit count parameter applies to both the latency and transmission parts. A collection of delays fixed-rate and load-dependent devices representing components of the infrastructure can be included in the model. In the preferred embodiment of the present invention, a network delay element can be thought of as a delay device which imposes a fixed delay on every transaction associated with a workload w, regardless of the number of transactions. The transmission element captures the finite transmission capacity of the network. Other embodiments may explicitly associate delay devices with NICs or other networked components.

The set of parameters described in Table 1 sufficiently defines a model useful for performance analysis and calculating a transformation between a source data center configuration and a destination data center scenario. Furthermore, the output of the transformation is a new instance of parameters that sufficiently describe the destination data center scenario for performance analysis by a standard queuing theory solver. A base data center configuration is a special configuration of parameters, where most of the parameters have been taken from actual measured data on a given data center configuration. Modifications to a base data center configuration are called destination data center scenarios or derived data center scenarios, which come in several types. In one embodiment of the invention, the scenario types of interest are server consolidation and workload reassignment scenarios. In what follows, a source server is defined as a server of the source data center configuration and a destination server is defined as a server within the destination data center.

Figure 3:
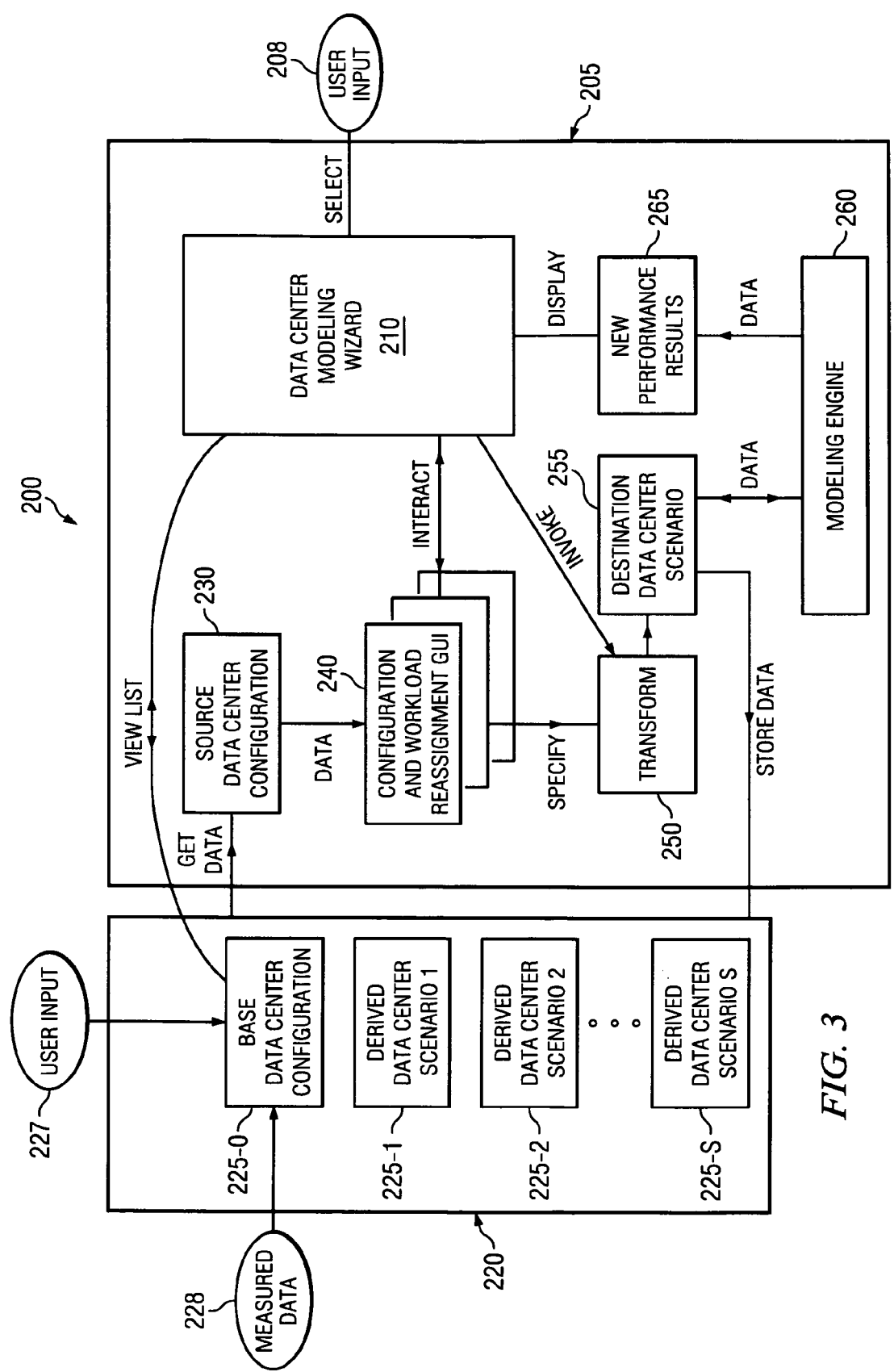
FIG. 3 is block diagram of a server migration modeling tool in the preferred embodiment of the present invention.

FIG. 3 describes the function of server migration tool 200 of the present invention within the present embodiment. Server migration tool 200 is an apparatus, comprised of a modern computer (not shown) with dynamic RAM, a display device, a keyboard device, a pointing device (mouse) and a hard drive for data and program storage, on which a programmed set of software instructions are operated to implement the functional arrangement shown in FIG. 3. In the preferred embodiment of the present invention, the server migration tool 200 utilizes a capacity planner program 205 to provide a user interface to gather user input 208 and which contains certain inherent and useful functions such as reading and storing data files, facilitating communications between functional modules, displaying results on the display device and operating a modeling engine. Capacity planner 205 is a software framework for the functional components of server migration tool 200.

In addition to capacity planner 205, server migration tool 200 uses stored scenarios 220 which comprises a BASE data center configuration 225-0 and a set of S derived data center scenarios 225-1, 225-2, . . . 225-S. S may be zero, in which case there are no derived data scenarios, however BASE data center configuration 225-0 is required by the preferred embodiment of the present invention. BASE data center scenario 225-0 is constructed from measured data 228 in combination with user input data 227 and stored prior to invoking server migration tool 200. Measured data 228 is data taken on an actual data center implementation either in production or in a test environment using tools and methods well-known in the art, for example, IBM Tivoli Monitoring Tool (Tivoli I™) or HP Openview. Examples of measured data are the measured utilizations UMC(t), UMD(t) and UMN(k), the network response times, R(k,w), workload arrival rates AB(w), visit counts per workload SV(t,w) and DV(k,w). User input data 227 is data generated and stored by a user, for example, in a spreadsheet and contains such information as the names of the servers, NAME(t), number of servers C1, the number of disks D1, mapping between servers and disks, DISKS(t), server dimensions SD(t), processor counts PC(t), CPU and disk speed ratings CS(t) and DS(k), memory capacities MC(t), and so forth. Stored scenarios 220 are typically stored on an internal hard drive of the host computer.

Capacity planner 205 contains a selected source data center configuration 230, stored temporarily as an input source of parameters, a data center modeling wizard 210 for servicing user input 208 and for process control, a set of configuration and workload reassignment GUIs 240 for collecting and organizing source and destination data center parameters, a transform engine 250 for creating a destination data center scenario from a source data center scenario, a destination data center scenario 255 stored temporarily as an output of transform engine 250, a modeling engine 260 for computing performance results, and a set of performance results 265 stored temporarily as an output of modeling engine 260.

Data center modeling wizard 210 is invoked by capacity planner 205 to destination data center scenario 255 utilizing various inputs and selections from a user. With user input 208 via the keyboard or mouse of the given apparatus, data center modeling wizard 210 guides a user of the present invention in selecting a source data center scenario or configuration from stored scenarios 220. Once the selection is made, data including parameters as described in Table 1 are loaded into source data center configuration 230. Typically, a user will begin by selecting the BASE data center scenario 225-0 and build a set of derived (destination) data center scenarios 225-1, . . . 225-S investigating and comparing the performance of the derived data center scenarios with each other and with the BASE data center scenario 225-0. Data center modeling wizard 210 functions to generate a set of configuration and workload reassignment GUIs 240 to establish the desired input parameters for creating the destination data center scenario 255. Once the input parameters are created data center modeling wizard 210, through user input 208 invokes transform engine 250 to generate destination data center scenario 255. Data center modeling wizard 210 stores the newly generated destination data center scenario 255 in stored scenarios 220. Finally, data center modeling wizard 210 displays performance results 265. In the preferred embodiment, performance results 265 are displayed in a set of graphic reports which facilitate easy and rapid comprehension by the user.

Configuration and workload reassignment GUIs 240 function to allow a user to create the input parameters for destination data center scenario 255 by easily specifying changes to the existing configuration in the source data center configuration 230. Examples of such changes include the selection of servers Select servers from which work is to be moved and to which work is to be moved, the addition of new servers, and growth rates of workload arrival rates. More specifically, configuration and workload reassignment GUIs 240 function to populate the elements of a mathematical transformation matrix that is used by transform engine 250 to generate destination data center scenario 255. GUIs 240 will be further described in connection with FIGS. 5 through 15.

The function of transform engine 250 is to generate a set of parameters suitable for use by modeling engine 260 to create predicted throughputs and utilizations corresponding to the destination scenario input parameters set by GUIs 240. The operation and algorithms of transform engine 250 will be described fully below.

Figure 2A:
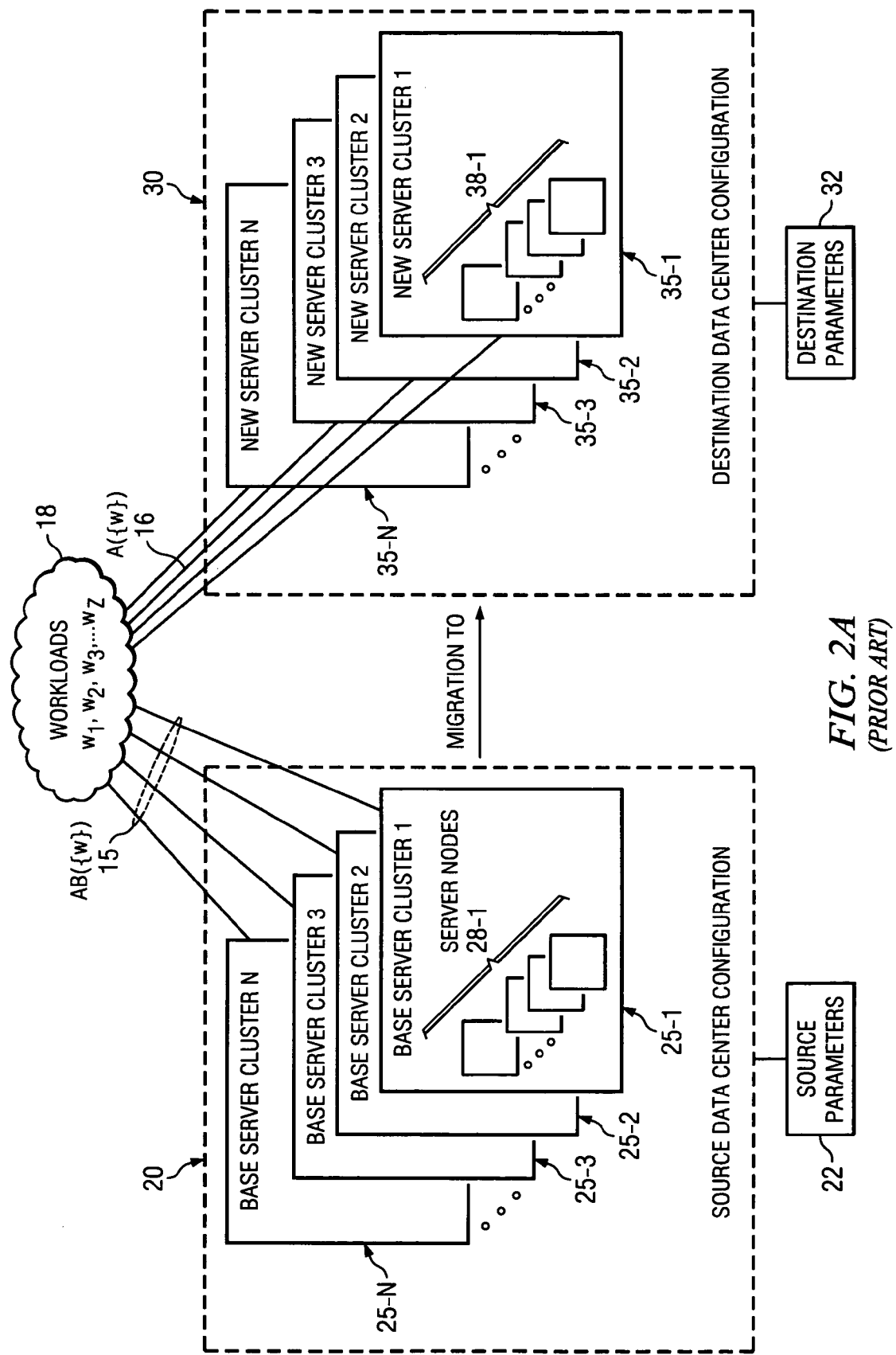
FIG. 2A is a block diagram depicting a server migration from a source data center to a destination data center.
Figure 2B:
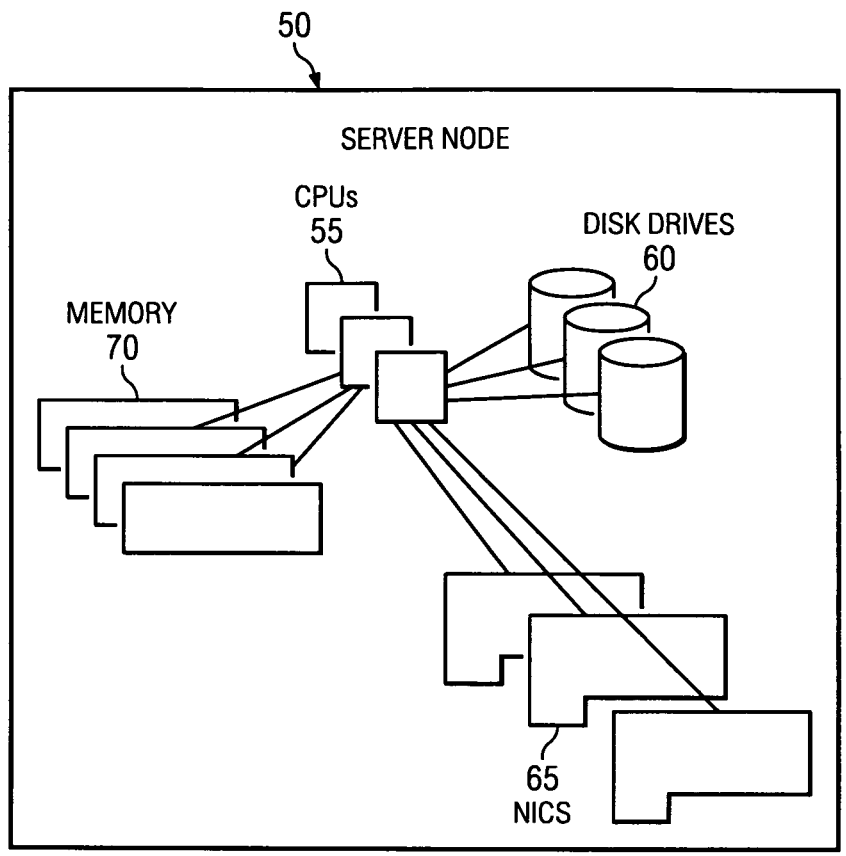
FIG. 2B is a block diagram showing the components of a server node within a data center configuration.
Figure 5:
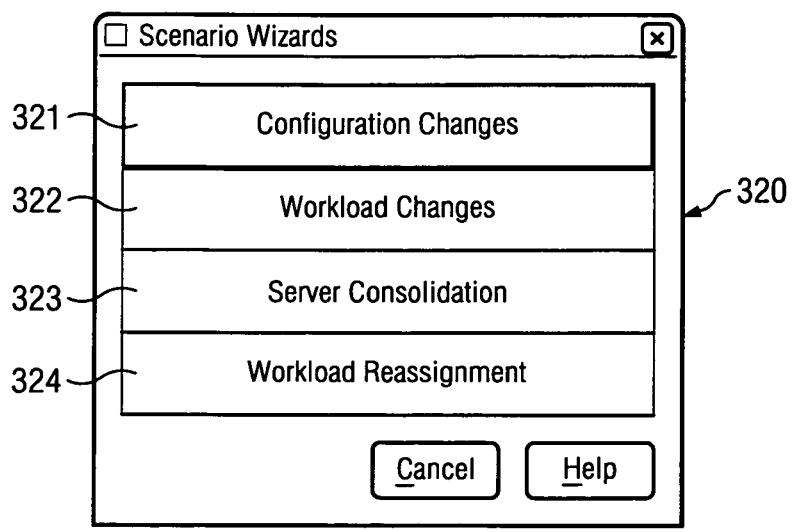
FIG. 5 is a screen shot of a Scenario Wizards GUI in the preferred embodiment of the present invention.

The function of modeling engine 260 is to apply the methodology of standard queuing theory solver to take baseline configuration parameters such as those shown in FIG. 2 and generate standard outputs. These standard outputs include throughputs, utilizations, populations (means and distributions) and mean response times for each device for each workload. The specific apparatus and methods of the modeling engine 260 and the graphical user interface to select specific forms of output are known in the art. One example utilized in the present invention is IPS Capacity Manager available from Hyperformix of Austin, Tex.

To those skilled in the art, usage of a windows oriented graphical user interface, such as the opening and usage of data center modeling wizard 210 is done in a manner common among software applications with a GUI. The application is opened from a menu or by double clicking on an application icon. Then the user selects and opens data center modeling wizard 210 using buttons, menus and forms much like one opens a document in any other application. When data center modeling wizard 210 has been opened, a screen such as Data Center Modeling screen 300 in FIG. 4 is displayed on the host machine.

Figure 4:
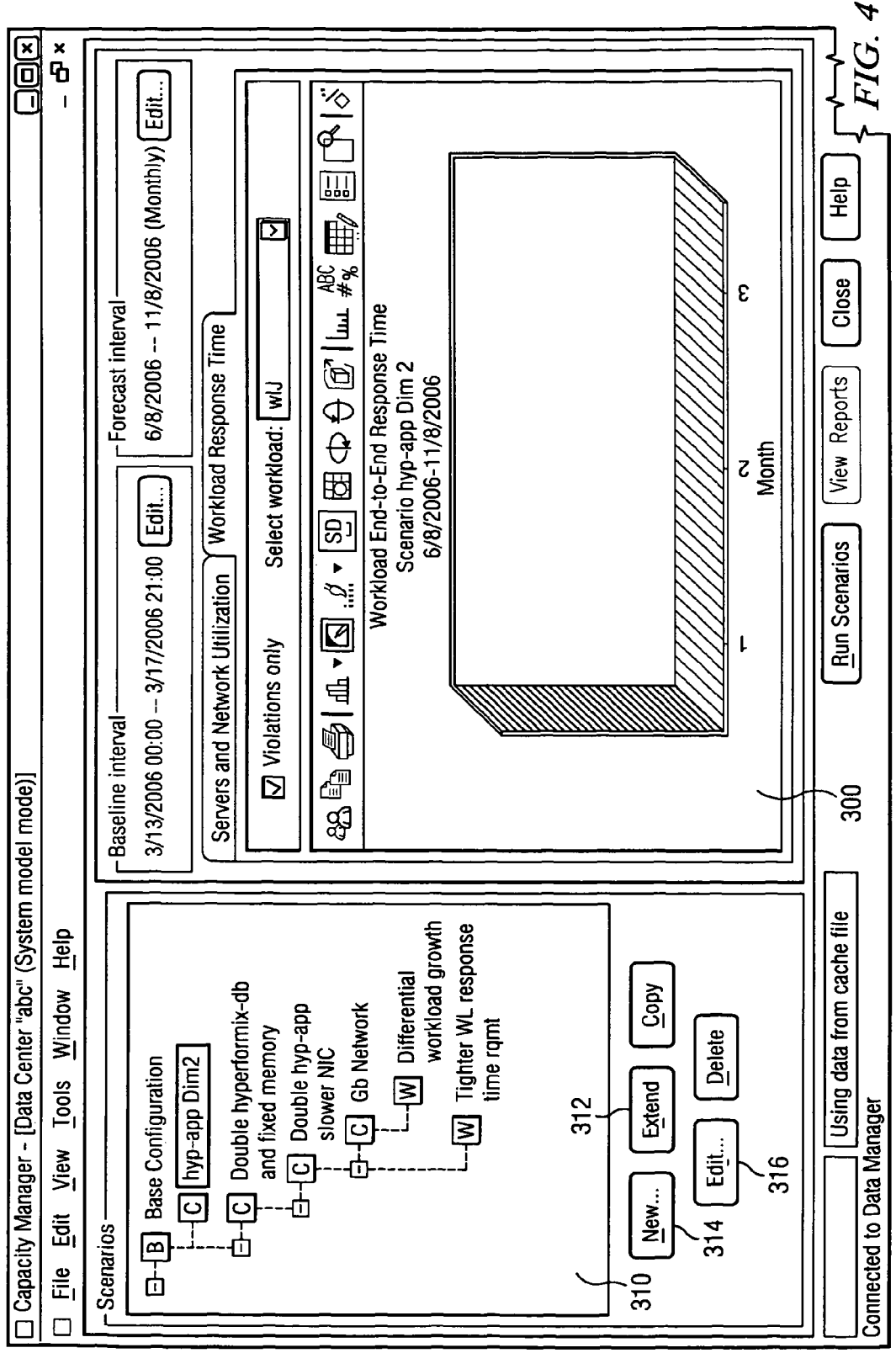
FIG. 4 is a screen shot of a Data Center Modeling Wizard in the preferred embodiment of the present invention.

Turning then to FIG. 4, the portion of the screen on the left is a group box 310 labeled "Scenarios". The group box 310 lists all of the stored scenarios 220 that are available for selection. The stored scenarios 220 are organized in a tree structure list that illustrates the derivation relationship between scenarios. The scenario represented by a child node is an extension of the scenario represented by its parent node. That is, the child node scenario definition starts with the parent scenario definition and extends that definition with additional user defined modifications. For example, in the tree shown, the definition of scenario "GB Network" is the definition of the "Base Configuration", plus the changes specified in the "Double hyperformix-db and fix memory" scenario, plus the changes specified in "Double hyp-app slower NIC" scenario, plus the changes specified in the "Gb Network scenario". This approach allows a complex scenario to be built out of a series of small changes and makes it easy to see what has changed between scenarios.

Any of stored scenarios 220 shown in group box 310 of FIG. 4 can be the starting point for a new server consolidation or workload reassignment scenario, i.e. destination data center scenario 255. To begin defining a new scenario, a user clicks on the scenario to be used as the starting point such that it is highlighted, then clicks either the New button 314 or the Extend button 312. The two buttons have a similar effect: in what follows it is assumed that the Extend button 312 is clicked. The function of Edit button 316 will be described later in the document. Selection of the New Button 314 forces the selection of the Base configuration shown in group box 310 as the starting scenario, otherwise the subsequent behavior is identical to selecting the Extend button 316.

When Extend button 312 is clicked, a particular configuration and workload reassignment GUI 240 called the Scenario Wizards GUI is opened. Scenario Wizards GUI 320 is shown in the screen shot of FIG. 5 and is the first of several GUIs 240 involved in a process that will be described further. A user clicks on Server Consolidation button 323 to create a server consolidation scenario or clicks on Workload Reassignment button 324 to create a workload reassignment scenario. To simply change the server or network configuration parameters of a scenario, for example, upgrading a CPU to a server, a user clicks on Configuration Changes button 321. To set growth parameters and time intervals to effect workload changes in the model a user clicks on Workload Changes button 322. Note that Configuration changes and Workload changes can be done as extensions to other scenarios, including as extensions to previously generated Server Consolidation or Workload Reassignment Scenarios.

Figure 6:
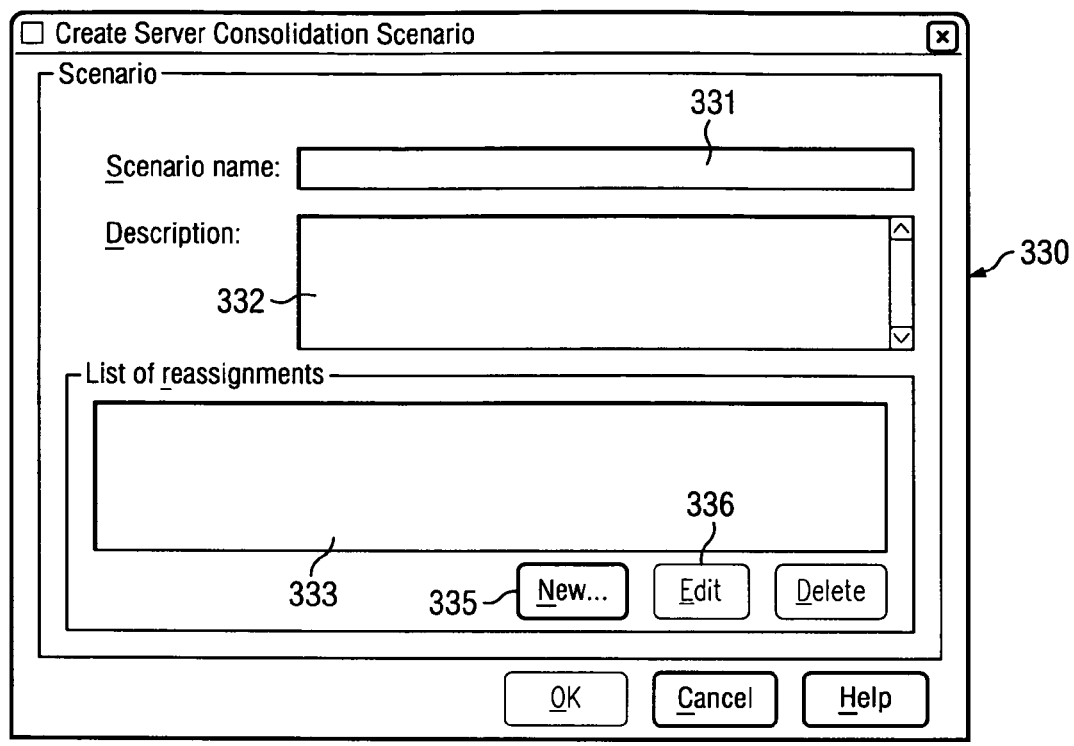
FIG. 6 is a screen shot of a Server Consolidation Scenario GUI in the preferred embodiment of the present invention.

When the Server Consolidation button 323 is clicked, the Create Server Consolidation Scenario GUI 330 appears as shown in FIG. 6. A user enters the scenario name in box 331 and a scenario description in box 332 and creates one or more reassignments using the New button 335. It is in the reassignments process where the server consolidation is specified. Server consolidation involves moving the work from one or more existing source servers to one or more existing or hypothetical destination servers. A list of desired reassignments of work from old servers to new servers is input in dialog box 333. Alternatively, if reassignments have been previously defined, the Edit button 336 will become active and the user can choose to edit an existing reassignment instead of creating a new one from scratch.

Figure 7:
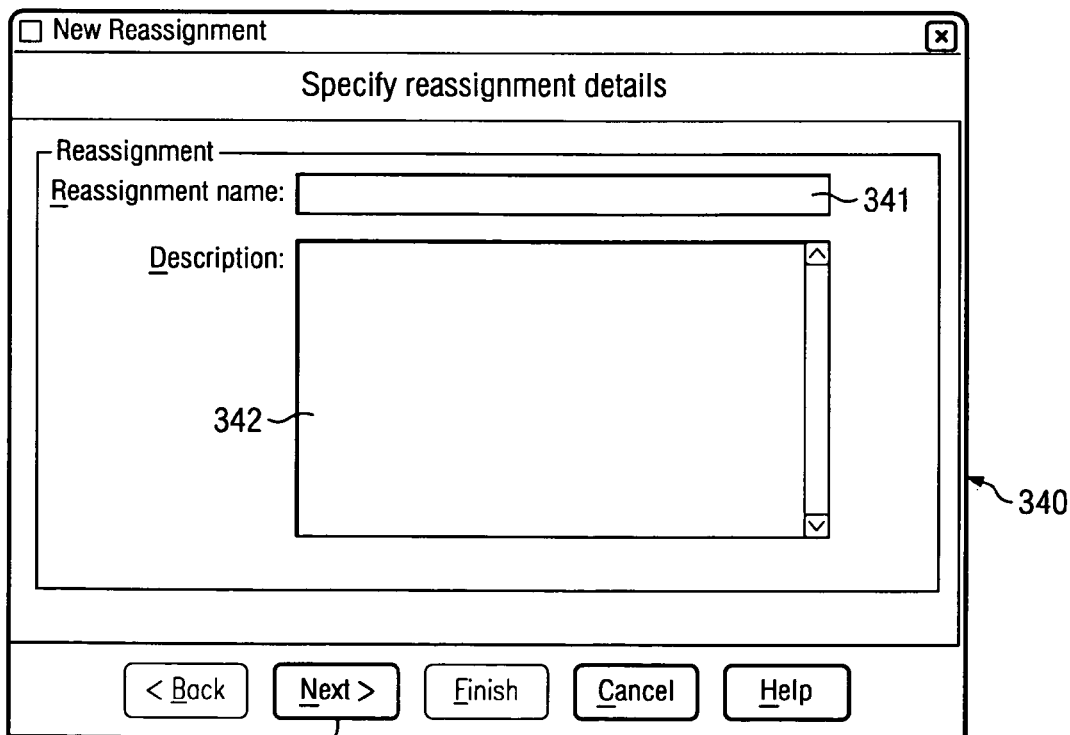
FIG. 7 is a screen shot of a Specify Reassignment Details GUI in the preferred embodiment of the present invention.

When the New button 335 is clicked, a Specify Reassignment Details GUI 340 is opened as shown in FIG. 7. The reassignment is given a name and an optional description for future reference by typing a name in box 341 and a description in box 342. The Next button 345 is clicked to move to the next step in the reassignment process which is to choose the source servers for which all work is to be moved to the destination servers.

Figure 8:
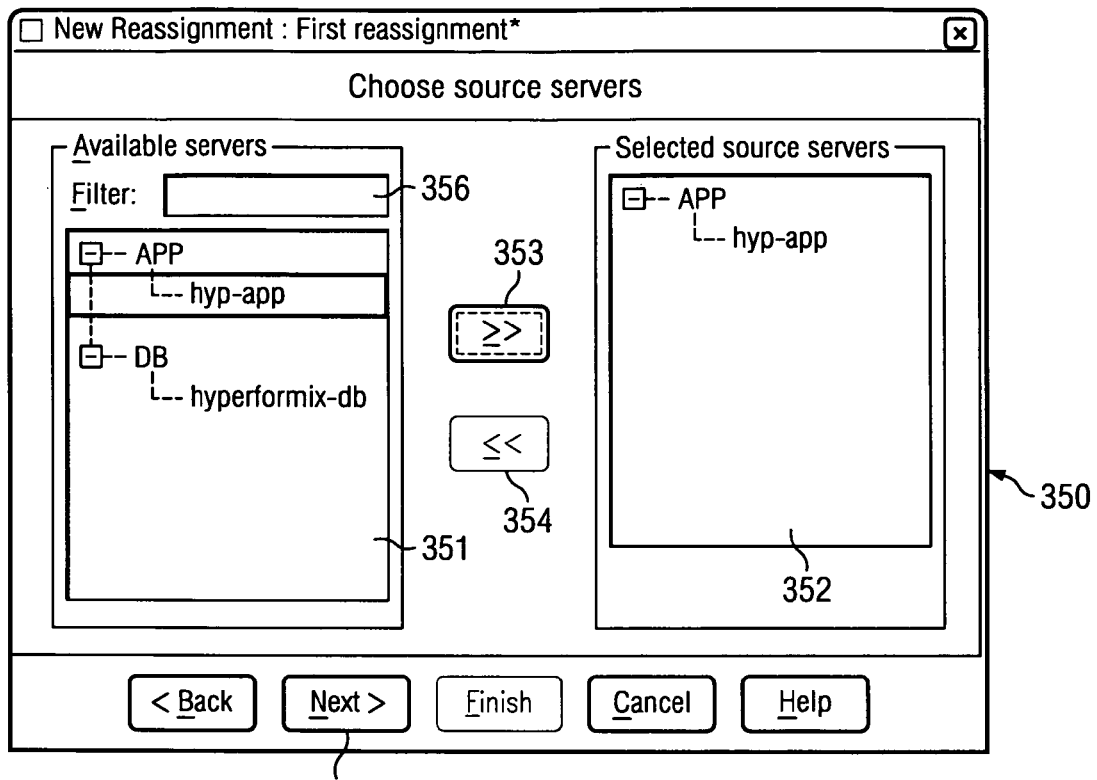
FIG. 8 is a screen shot of a Choose Source Servers GUI in the preferred embodiment of the present invention.

When the Next button 345 is clicked, Choose Source Server GUI 350 opens as shown in FIG. 8. The Choose Source Servers GUI 350 is used to select the set of servers from the source scenario for which the work is to be moved. The Choose Source Servers GUI 350 lists in tree view 351, the available infrastructure servers in the source data center configuration 230 organized by tier. If a tier was not previously designated for a server, data center modeling wizard 210 groups those servers under a 'No Tier' node in tree view 351 (not shown). A tier is a collection of similar server types, for example, the APP tier shown in tree view 351 is a collection of application servers and the DB tier is a collection of database servers. One or more servers or tiers of servers are added to the Selected source servers list 352 by clicking on the name so that it is highlighted and then clicking on the '>>' button 353. The '<<' button 354 is used to delete source servers from the Selected source servers list 352. In some cases the list of available servers may be quite large. In the preferred embodiment, a filter function on available servers is provided by typing a wildcard (*) symbol or question mark (?) symbol in combination with search strings into the filter box 356. As an example, use *web* to select server names that contain the word web somewhere in the name, use web* to select all server names that begin with web, or use *web to select all server names that end with web. Use w?b to select server names that match web, wab, or wxb. You can combine the * and ? wild cards in a pattern. Data center modeling wizard 210 reassigns resource consumption attributable to all workloads defined on the chosen source servers to the destination servers (yet to be defined). The Next button 355 is selected to move to the next step in the reassignment process which is to choose the destination servers for the destination data center scenario 255.

Figure 9:
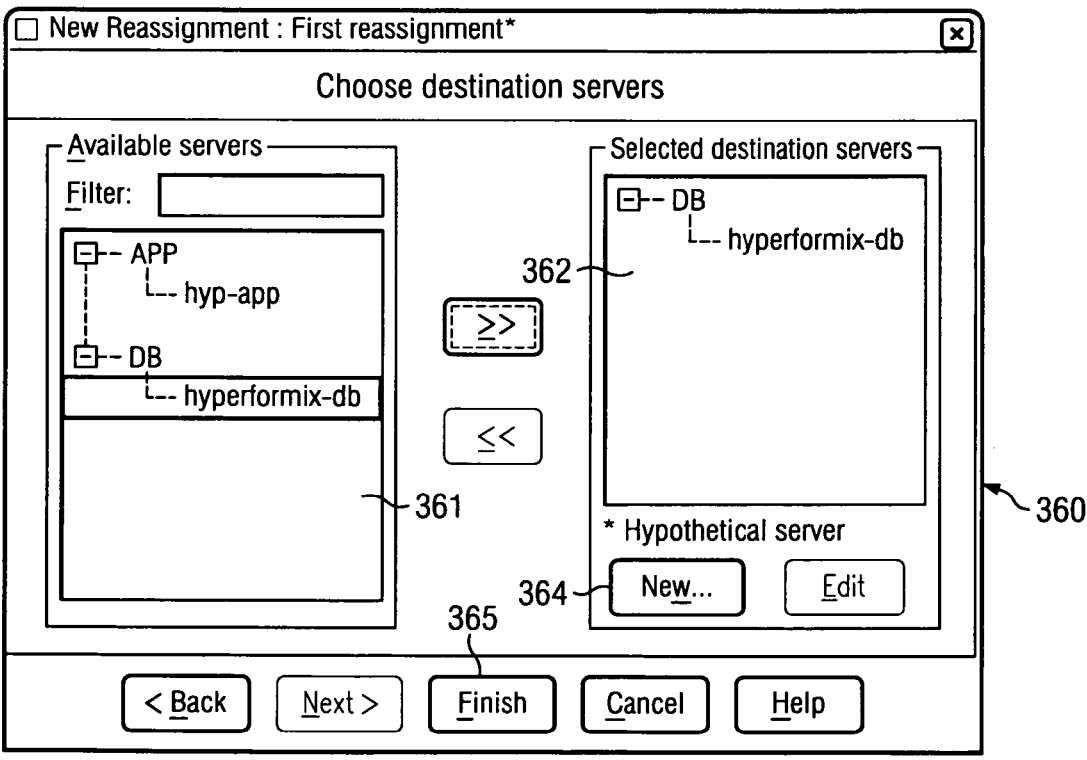
FIG. 9 is a screen shot of a Choose Destination Servers GUI in the preferred embodiment of the present invention.

When the Next button 355 is clicked, Choose Destination Server GUI 360 opens. FIG. 9 shows the Choose destination servers GUI 360 which operates to allow for the selection of destination servers for the destination data center scenario 255 by creating a list of selected destination servers 362 from the set of available servers 361, which in the preferred embodiment of the present invention, is the set of servers in the source data center scenario 255. In contrast to GUI 350, "New" button 364 is utilized in GUI 360 to create a new hypothetical server which may be included in the destination servers list 362. The server is said to be hypothetical because it represents a server that is not part of the base configuration of source data center configuration 230 and there is no performance data available on this server to represent a baseline workload. When the Finish button 365 is clicked on the Choose destination servers GUI 360, the scenario definition is saved if valid and the Data Center Modeling Screen 300 is displayed.

Figure 10:
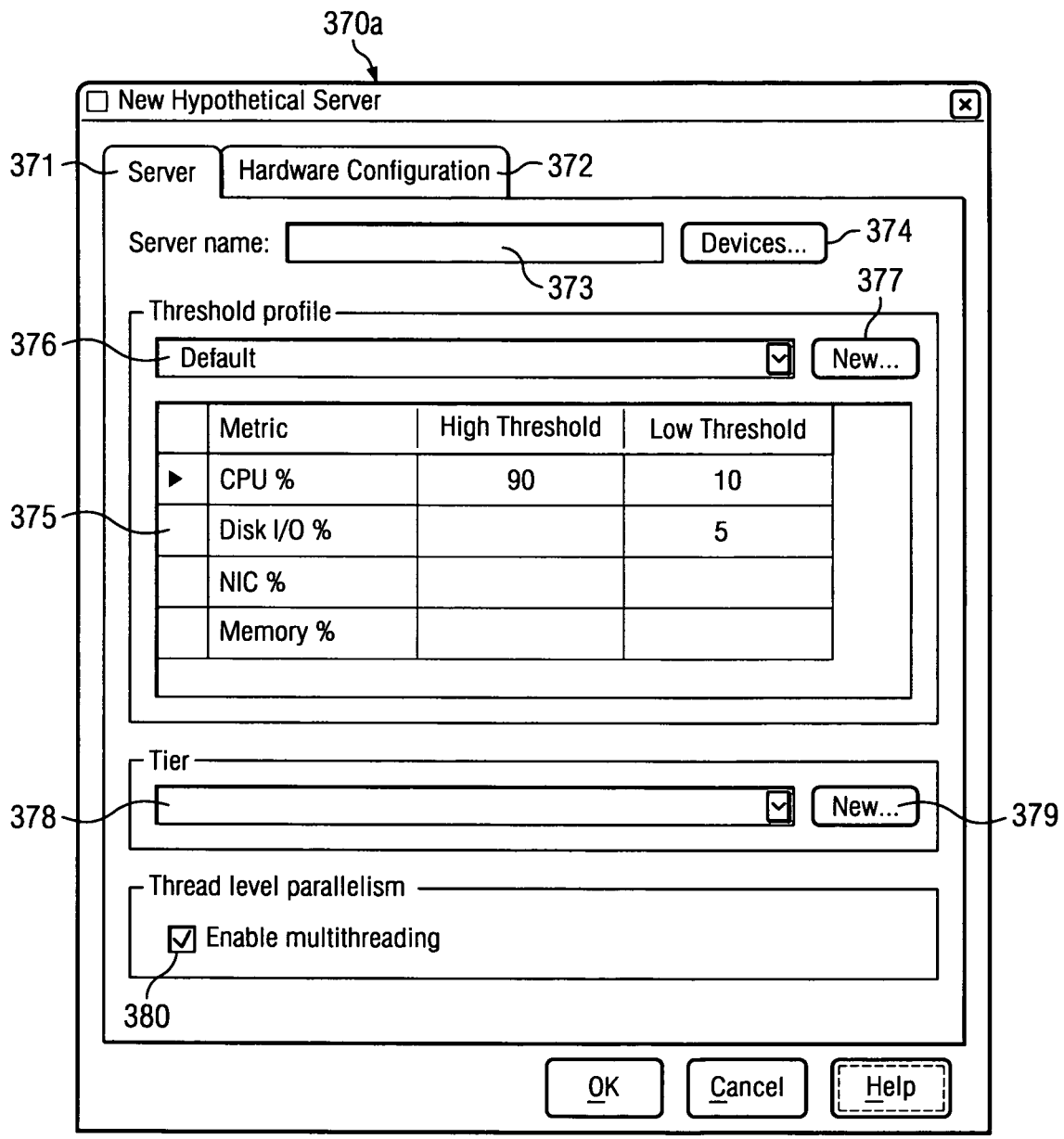
FIG. 10 is a screen shot of a New Hypothetical Server GUI server tab view in the preferred embodiment of the present invention.

The New Hypothetical Server GUI 370a shown in FIG. 10 appears when "New" button 364 is clicked and serves to allow a user to define a model of a server including disk drives and NICs that may be associated with it. The server tab 371 or hardware configuration tab 372 is selected according to which parameters are currently of interest. The screen shot in FIG. 10 coincides with the server tab 371 enabled so that various server functions may be defined. A server name is specified in box 373. Devices button 374, upon being clicked opens a dialog box (not shown) to allow for selection of disk drives and NICS: at least one disk and one NIC must be selected for the hypothetical server to be valid; the mappings to the new hypothetical server are held in DISKS(k) or NICS (k). A threshold profile table 375 is defined by either selecting an existing profile from drop down menu 376 or by clicking New button 377 to create a new threshold profile. Threshold profile table holds high and low threshold utilizations for CPU, Disk I/O, NIC I/O and memory. The new hypothetical server may be assigned to a network tier by using drop down menu 378 or clicking New button 379 to create a new tier. Multithreading may be enabled in the server model by checking check box 380.

Figure 11:
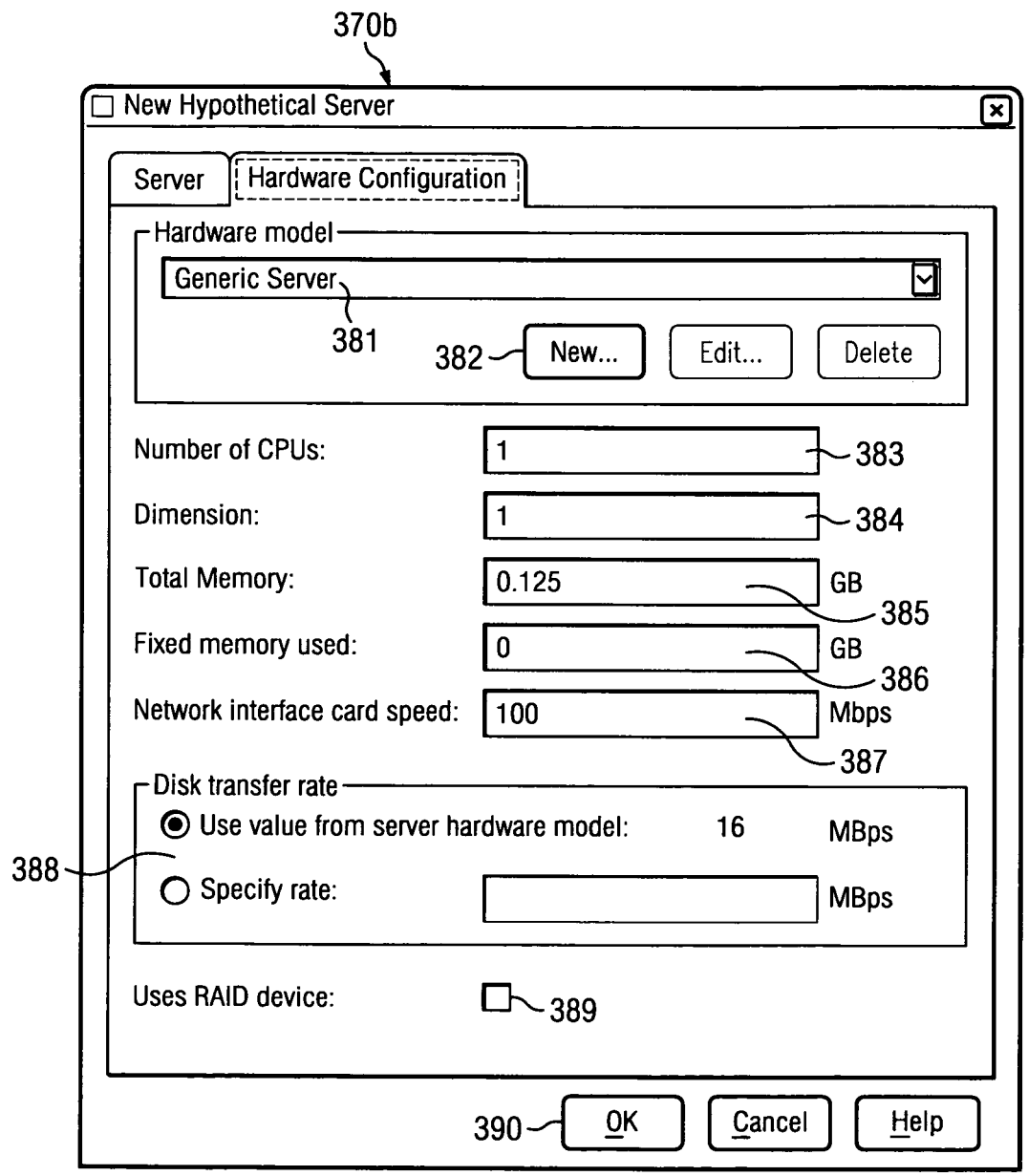
FIG. 11 is a screen shot of a Hardware configuration GUI in the preferred embodiment of the present invention.

If the user clicks Hardware configuration tab 372, a corresponding Hardware configuration GUI 370b is opened to allow the user to specify hardware details in the hypothetical server model. Hardware configuration GUI 370b is shown in FIG. 11 and is used to specify a hardware model by selecting from drop down menu 381 or creating a new model by clicking New button 382. Hardware configuration GUI 370b is also used to set the number of CPUs, CP(h), in box 383; dimension SD(h), in box 384; total memory MC(h), in box 385; fixed memory utilization, MFIXED(h) in box 386; NIC speed, NS(h) in box 387; absolute disk transfer speed in box 388; and the use of a RAID array in checkbox 389. The subscript h represents the subscript assigned by data center modeling wizard 210 to the new hypothetical server thereby created. When all dialog boxes have been filled, the GUI form is submitted by clicking "on" button 390. The selection of these parameters and the server parameters is straightforward to those skilled in the art of computer performance modeling and will not be described in more detail here. It is relevant to the present invention that destination data center server models may be created out of existing server models or new hypothetical server models so that server consolidation scenarios may be fully explored by the user.

Figure 12:
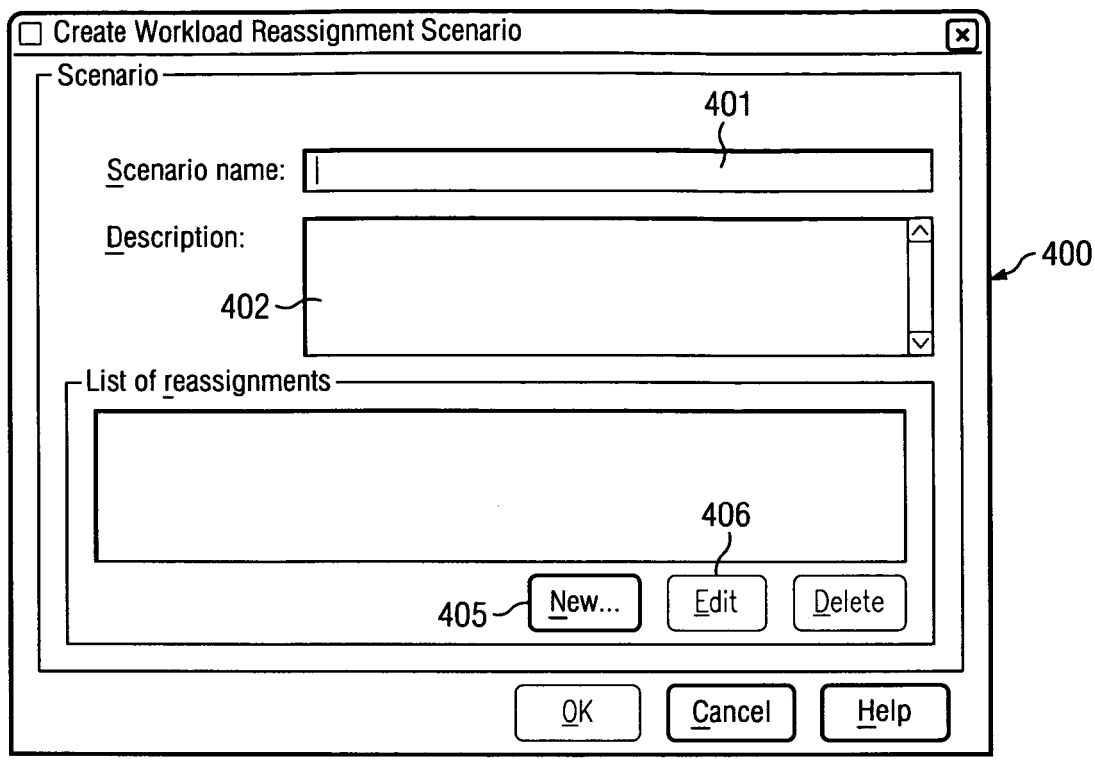
FIG. 12 is a screen shot of a Create Workload Reassignment Scenario GUI in the preferred embodiment of the present invention.

In the preferred embodiment of the present invention, a general Workload Reassignment scenario may be created as the destination data center scenario 255. Beginning with the Scenario Wizards GUI 320 of FIG. 5, the Workload Reassignment button 324 is selected to open a Create Workload Reassignment Scenario GUI 400 which is shown in FIG. 12. A user enters the scenario name in box 401 and a scenario description in box 402 and creates one or more reassignments using the New button 405. In each reassignment a user can specify the reassignment of single workload. The workload can be moved from one or more source servers to one or more destination servers. The user can choose to move only a fraction of the workload from any of the source servers. In contrast to the Server Consolidation process in which all workloads associated with a server are reassigned, the Workload Reassignment process allows a user to build a complex reassignment of work from source to destination as needed. Alternatively, if reassignments have been previously defined, the Edit button 406 will become active and the user can choose to edit an existing reassignment instead of creating a new one from scratch.

Figure 13:
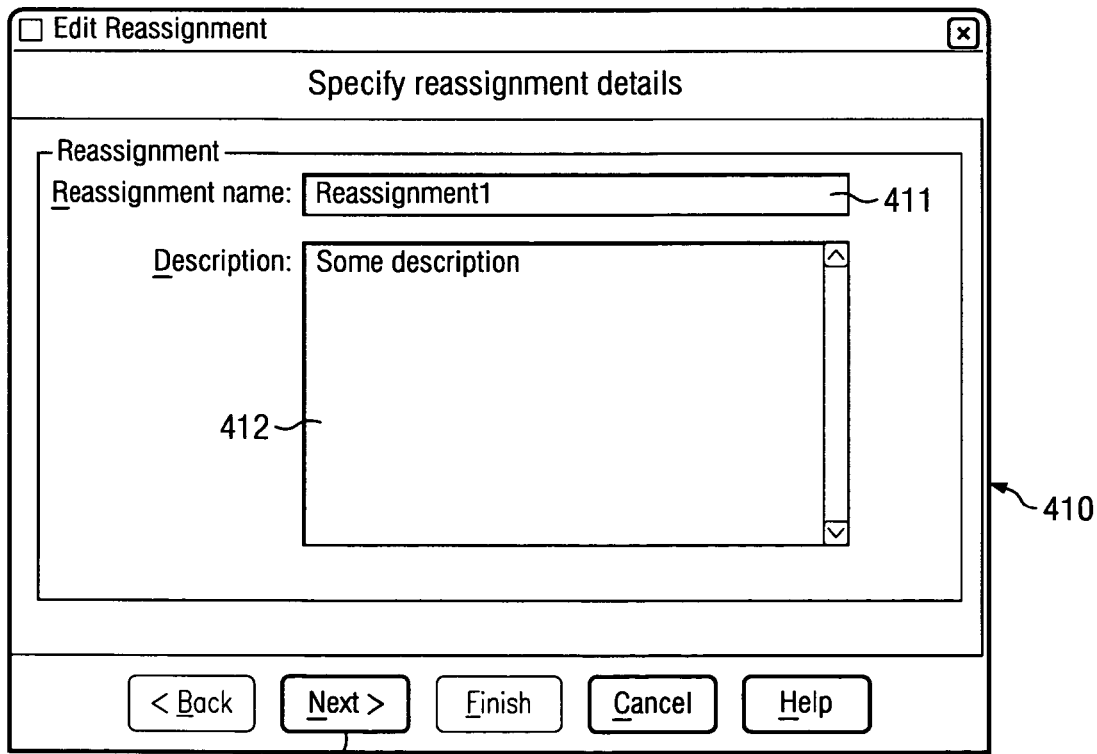
FIG. 13 is a screen shot of a Specify Reassignment Details GUI in the preferred embodiment of the present invention.

When the New button 405 is pressed, a Specify Reassignment Details GUI 410 is opened as shown in FIG. 13. The reassignment is given a name and an optional description for future reference by typing a name in box 411 and a description in box 412. The Next button 415 is selected to move to the next step in the Workload Reassignment process which is to choose the workload reassigned to the destination servers.

Figure 14:
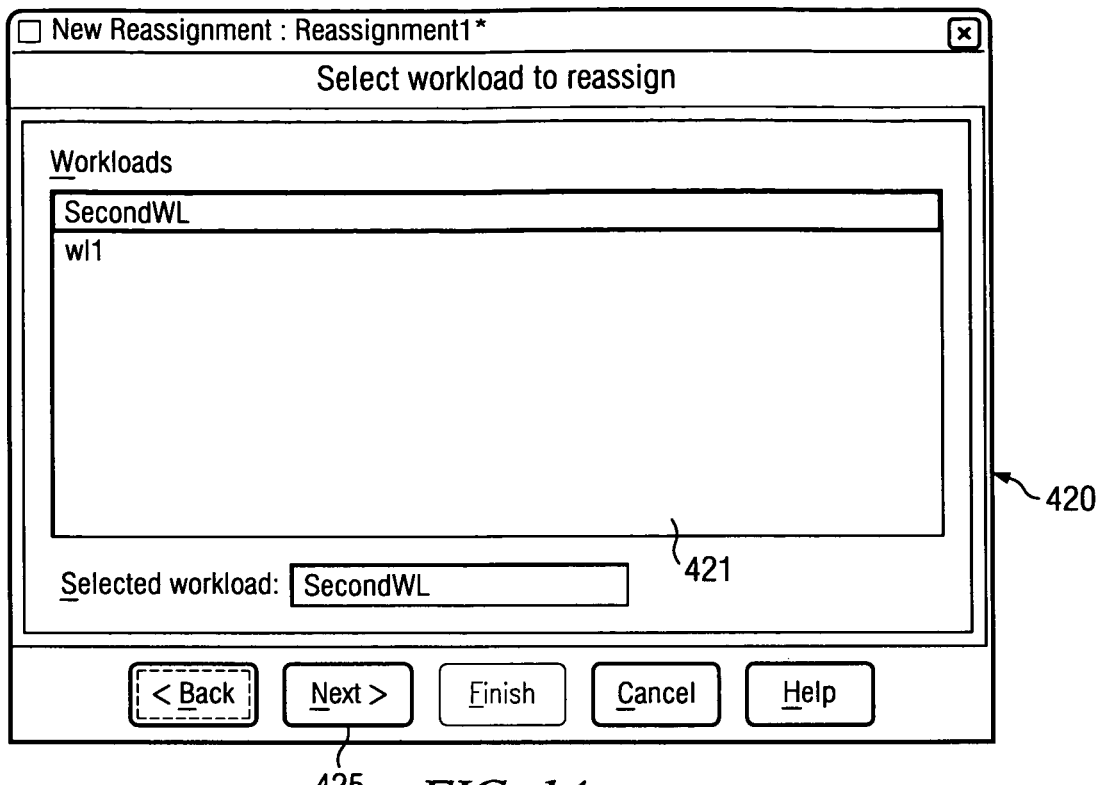
FIG. 14 is a screen shot of a Select Workload to Reassign GUI in the preferred embodiment of the present invention.

When Next button 415 is clicked, the Select Workload to Reassign GUI 420 is opened and appears as shown in FIG. 14. GUI 420 simply shows a list of workloads 421 that exist in the source data center scenario. The desired workload is selected and the Next button 425 is clicked to invoke the Choose Source Servers GUI 350 which operates in the same way as previously described.

Figure 15:
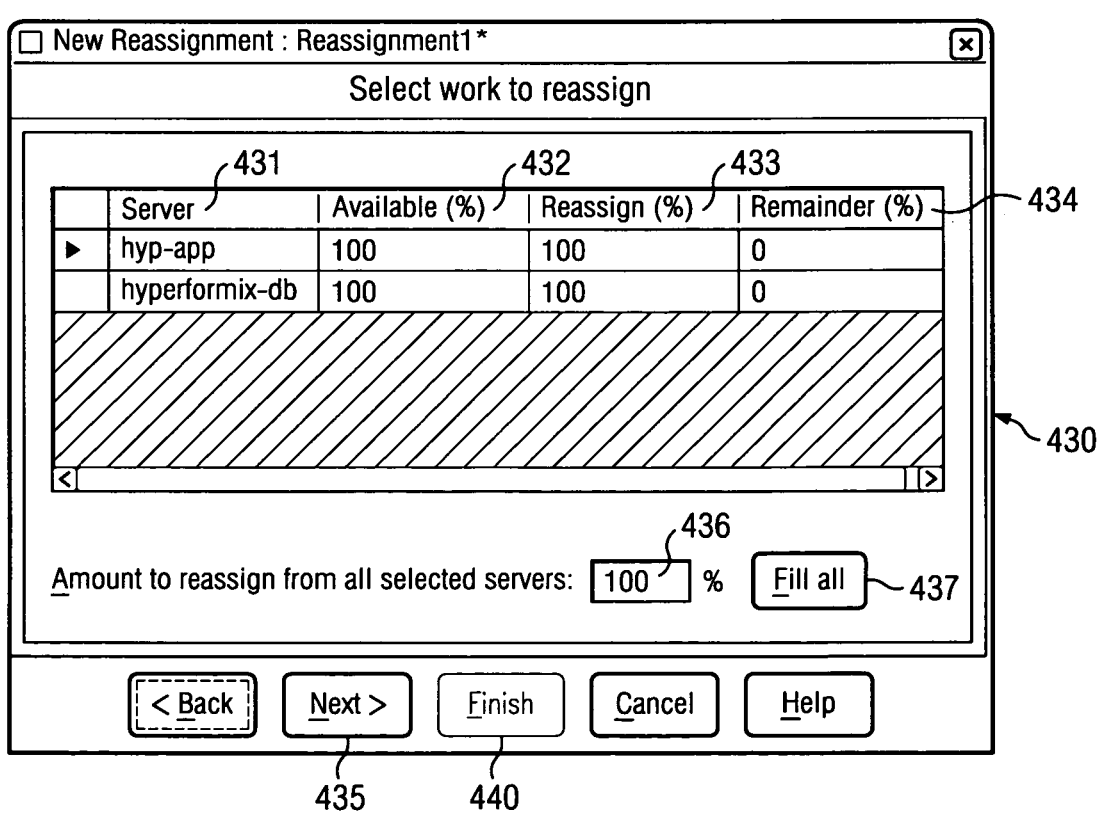
FIG. 15 is a screen shot of a Select Work to Reassign GUI in the preferred embodiment of the present invention.

When the Choose Source Servers GUI 350 closes under the Workload Reassignment process, the Select Work to Reassign GUI 430 of FIG. 15 automatically opens. Referring to FIGS. 14 and 15, each source server selected in Choose Source Servers GUI 350 is shown in the Server list 431 and in its corresponding row, the metrics Available % 432, Reassign % 433 and Remainder % 434. Available % 432 lists the percentage of workload that is not already reassigned in other reassignments such as in the Select Workload to Reassign GUI 420. Reassign % 433 lists the percentage of original workload to reassign. Original workload means the workload before any reassignments are made in the original source data center configuration 230. The default for Reassign % 433 is all of the available work—the amount to reassign cannot exceed the amount available. Remainder % 434 lists the percentage of original workload left on the source server after the reassignment. To designate the reassignment, one an amount to reassign is typed into box 436. Then the Fill all button 437 is clicked to effect the reassignment for all of the listed servers. Alternatively, the user can type a value directly into the Reassign % 433 column in the desired row.

Upon completion of the Select Work to Reassign GUI 430 the process continues by opening the Choose destination servers GUI 360 which operates in the manner previously described to select a list of destination servers to include in the destination data center scenario 255. When the user clicks either the Finish button 440, or the Next button 435, the destination data center scenario is saved. Data Center modeling wizard 210 reassigns all resource consumption attributable to the workloads specified for reassignment in Select Work to Reassign GUI 430 from the source servers in source data center configuration 230 to the destination servers in destination data center scenario 255. In the preferred embodiment of the present invention, the reassigned workload is automatically distributed uniformly across the destination servers in destination data center scenario 255.

The editing of existing scenarios is done by selecting a scenario on the Data Center Modeling screen 300 (FIG. 4) and clicking the Edit button 314 under the scenario tree. This action will display the appropriate form for editing the scenario definition. The GUIs 240 used for editing scenarios are identical to the GUIs 240 used for creating new scenarios except for the GUI title and except that the GUIs 240 are pre-populated with the information the user previously specified in the definition.

Within the present invention, other interfaces are possible for representing server consolidation. One such approach is the use of known "drag and drop" GUI technology to "drag" one server on top of another to represent the reassignment of work from one computer to the other. In the case of workload reassignments, workloads would be dragged rather than servers. In the preferred embodiment the workloads are distributed uniformly across destination servers. Several other kinds of distribution of that work are easily implemented, including distribution according to destination resource capacity and proportional distribution explicitly specified by a user. The workload distribution could also be specifiable for each device.

Figure 16:
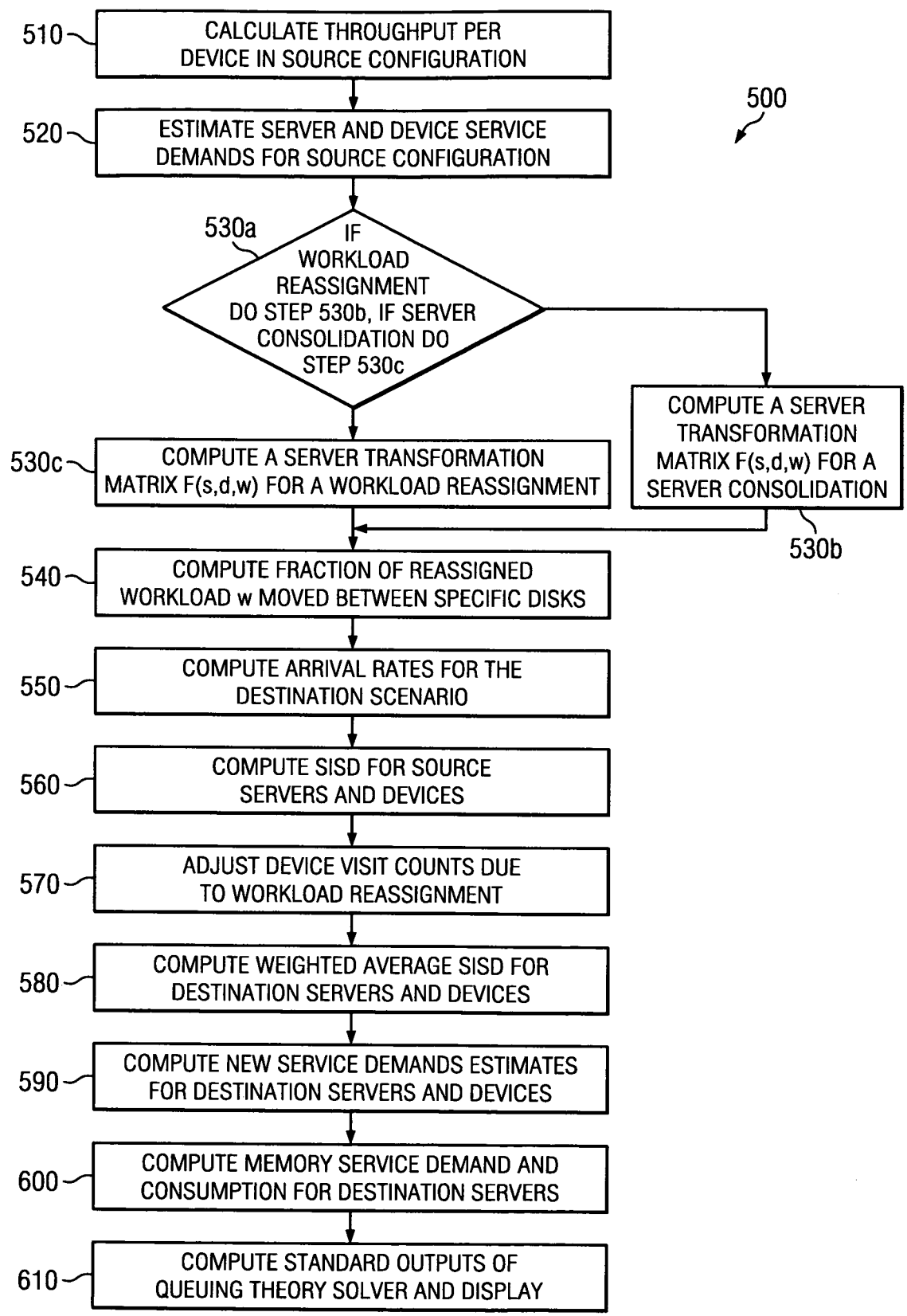
FIG. 16 is block diagram describing the scenario transformation method and process within the preferred embodiment of the present invention.

Moving to FIG. 16, a description now follows of the preferred transformation method and process 500 of the present invention for transforming the server consolidation and workload reassignment scenario specifications and source data center configuration 230 parameters into new destination data center scenario 255 parameters. Both the source parameters and the destination parameters are suitable inputs for a standard queuing network model solver.

The transformation method and process 500 is summarized in FIG. 16. The first step 510 in the transformation method 500 is to calculate a throughput per device in the source configuration:

$$TPUT(k,w)=AB(w)*DV(k,w).$$

In the prior art of performance modeling, resource consumption is specified by the service demand and workload arrival rates. The service demand is the amount of processing time required for each workload on each visit to a given device with the use of the invention. However, it is possible to estimate service demands from device utilization and device efficiency parameters.

In step 520 of the transformation method 500, service demands are estimated for source data center configuration 230. Basic formulae for estimating service demands from measured utilization on an SMP system are:

$$PDC(s, w) = \frac{UMC(s) * P(s, w) * MUMAX(s)}{AB(w) * DV(s, w)};$$

$$PDD(k, w) = \frac{UMD(k) * P(k, w)}{AB(w) * DV(k, w)}; \text{ and}$$

$$PDN(k, w) = \frac{UMN(k) * P(k, w)}{AB(w) * DV(k, w)}$$

where PDC(s,w) is the server demand for source servers for the server s and the workload w; where PDD(k,w) is the source device demand for source disks for the device k and the workload w; and where PDN(k,w) is the NIC source demand for the source NICs for the device k and the workload w.

The memory service demand PDM(s,w) must be calculated from the measured memory usage during the baseline source interval. The units of memory service demand are Gigabytes per visit per second. Note that visits per second are the units of arrival First, the static components of memory usage must be removed to arrive at the total dynamic memory consumption.

$$MDYN(s, 0) = MP(s) - \left(MCORE(s) + \sum_w MFIXED(s, w)\right).$$

Next, dynamic memory is allocated among workloads in the same proportions as CPU usage.

$$MDYN(s,w)=MDYN(s,0)*P(s,w).$$

Dividing MDYN(s,w) by the baseline throughput yields the memory demand for destination server d $$PDM(s, w) = \frac{MDYN(s, w)}{TPUT(s, w)}.$$

In another embodiment of the present invention the fractional values equivalent to P(s,w) for memory may be set explicitly, and in yet another embodiment the fractional values are measured from workload-memory statistics. In step 530a of the transformation method, a decision is made to execute either step 530b or step 530c. If the server consolidation process has been used to specify destination data center scenario 255, then step 530b is executed. If the workload reassignment process has been used to specify destination data center scenario 255, then step 530c is executed The steps 530b and 530c of the transformation method 500 compute a server transformation matrix F(s,d,w). Workload relocation is specified by a three dimensional array F(s,d,w): the fraction of workload w to be relocated from source server s to destination server d. Values of F must range between 0 and 1. Since work is neither created nor removed by relocation, it must be true that the total activity for each workload is the same before and after relocation:

$$\forall s \forall w \sum_{d=1}^{C2} F(s, d, w) = 1.$$

If no workload relocation is done, the value of F (s,d,w) is 1 when s=d and 0 otherwise.

In step 530b, in which case a server consolidation scenario specifies the destination data center scenario 255, the server transform matrix F takes on the values:

$$F(s, d, w) = \frac{1}{NDS(s)}.$$

where NDS(s) is the number of destination servers per source server s. NDS(s) is derived from the specification of the server consolidation scenario. For example, if a user specifies that server s is to be "consolidated" onto servers d1 and d2, then NDS(s)=2. In server consolidation scenarios, the value of F(s,d,w) is the same for all workloads.

In step 530c, in which case a workload reassignment scenario specifies the destination data center scenario 255, the value of F(s,d,w) is:

$$F(s, d, w) = \frac{RP(s, w)}{100} \frac{1}{NDS(s)}.$$

where RP(s,w) is the relocation percentage for workload w on server s specified in the workload reassignment GUI 430 and NDS(s) is specified in choose source server GUI 350 and choose destination servers GUI 360. For workload reassignment scenarios, the value of F can vary between workloads.

In the computations that follow, the value of F(s,d,w) is applied uniformly to all resources. For example, if 20% of a workload's CPU activity is to be relocated to a destination server, then 20% of its disk and NIC activity must be relocated to the same destination server as well.

Since each server can have multiple disks and NICs, a device transfer matrix is needed to govern how the input/output activity associated with a given source-to-destination server pair and workload will be allocated to multiple peripherals on the given destination server.

In step 540 of the transformation method 500, the fraction of relocated workload w moved from disk i to disk j, BD(i,j,w), is computed. BD(i,j,w) is multiplied by the fraction F(s,d,w) of work moved from source server s to destination server d to determine the fraction of the original workload moved from device i to device j.

Values in the BD array are subject to the constraint that 100% of every workload for every source disk i must be assigned to some disk.

$$\forall i \forall w \sum_{j=1}^{j=D2} BD(i, j, w) = 1.$$

The no-relocation case is:
$\forall i \ \forall j \ \forall w \ BD(i,j,w)=1$ if $i=j$, 0 otherwise.

The array BN provides similar information for NICs. In the current implementation, work on disks and NICs is spread uniformly across all destination devices according to:

$$BD(i, j, w) = \frac{1}{ND(DSVR(j))}; \text{ and}$$

$$BN(i, j, w) = \frac{1}{NN(NSVR(j))}.$$

In step 550 of transformation method 500, destination data center scenario 255 arrival rates are computed taking into account the given workload growth, G(w,p): A(w,p)=AB(w)*G(p,w).

In step 560 of the transformation method, speed independent service demands for the source servers and devices are computed from the raw service demands of step 520. In order to handle speed differences between servers, it is useful to define the parameter speed independent service demand (SISD). Using such SISD parameters in workload relocation calculations eliminates the need to scale the contributions from each source server by that servers speed. The SISD is defined as
CPU: SIDC(t,w)≡CS(t)*PDC(t,w);
Disk: SIDD(k,w)≡DS (k)*PDD(k,w); and
NIC: SIDN(k,w)≡NS(k)*PDN(k,w)

The SISD parameter is a novel concept. The SISD technique converts the original service demands to a speed-independent form that avoids the complex conversions and bookkeeping. The SISD technique combines a performance rating, such as a SPEC rating for a computer processor, with a demand measurement in units of time to arrive at a scaling parameter. For instance, a service demand of three seconds for a CPU device with a SPEC rating 1000 is converted to a service demand of 3000 SPEC-seconds, which is now independent of the original device speed. If a what-if scenario replaces the original device with a 2000 SPEC rating device, the new service demand is still 3000 SPEC-seconds. The service TIME will be reduced from three seconds to 3000 SPEC-seconds/2000 SPEC=1.5 seconds. In complex what-if scenarios such as server consolidation, the speed-independent service demands can be moved or added in a straightforward way.

In brief, SISD simplifies the calculations of service times in any computer performance model for what-if scenarios involving changes in device speeds or reassignment of work to new devices with different device speeds.

This technique has applicability to performance models of any technology, not just computer-related technology, where service times depend upon the speed of the devices being modeled. For example, for a machine with a performance rating in horsepower, the SISD parameter would be horsepower seconds. Similarly, for a machine with a performance rating in revolutions per minute (RPM), the SISD parameter would be RPM seconds. As a further example, for a job task with a performance rating of man hors, the SISD parameter would be man hour seconds. Of course, those skilled in the art will recognize that the time parameter given here as "seconds" can take on other units of time as is convenient for the problem definition at hand.

In the preferred embodiment of the present invention, workload reassignments are represented by adjusting the visit counts of each server. Initially, each server has a visit count of 1. In step 570 of the transformation method 500, the destination data center scenario 255 device visit counts are adjusted according to workload reassignment parameters and for dimension. Some definitions of visit count parameters that will be used in the calculations to follow are shown in Table 2.

TABLE 2

| | |
|---|---|
| SVCU(t, w) | Server visit counts for server t and workload w without considering server dimension |
| SVCD(t, w) | Server visit counts for server t and workload w considering server dimension |
| DVCU(i, w) | Device visit counts for device I and workload w without considering dimension |
| DVCD(i, w) | Device visit counts considering dimension |
| PSVU(t, w) | Server visit counts, without dimension, before a relocation |
| RSVU(t, w) | Server visit counts, without dimension, after a relocation |

In a non-relocation scenario, all visit counts are 1:
PSVU(t,w)=RSVU(t,w)=1.

The new visit count in a relocation scenario is calculated by summing the contributions from each source server:

$$\forall d \forall w RSVU(d, w) = \sum_{s=1}^{C1} PSVU(s, w) \cdot F(s, d, w).$$

As indicated by the above calculations, any of the source servers can also be a destination server in the preferred embodiment of the present invention.

If a server has a dimension greater than one, then the visit count is reduced according to:

SVCD(t,w)=RSVU(t,w)/SD(t).

The relevant device visit count is the device visit count adjusted for the device dimension. For disks and NICs:

$$DVCD(k, w) = \frac{RSVU(DSVR(k), w)}{DD(k) * SD(DSVR(k))}.$$

In step 580 of the transformation method, the weighted average speed independent service demands (SISD) for the destination servers and devices are computed. Both raw service demand and SISD will vary across source devices. In the case where workload is relocated to a destination server from more than one source, it is necessary to construct a weighted average SISD for the destination server. Such a weighted average only accounts for possible differences in SISD between source servers/devices and is not intended to capture the effects of workload reassignment. The source SISD is weighted according to the source's contribution to the relocation multiplier. The weighted SISD for the destination servers is:

$$\forall d \forall w \, SIDC(d, w) = \frac{\sum_{s=1}^{C1} SIDC(s, w) \cdot PSVU(s, w) \cdot F(s, d, w)}{\sum_{s=1}^{C1} PSVU(s, w) \cdot F(s, d, w)}.$$

The weighted SISD for the destination disks is:
$\forall d \, \forall j \in DISKS(d) \, \forall w$.

$$SIDD(j, w) = \frac{\sum_{s=1}^{C1} \sum_{i \in DISKS(s)} SIDD(j, w) \cdot PSVU(DSVR(i), w) \cdot F(s, d, w) \cdot BD(i, j, w)}{\sum_{s=1}^{C1} \sum_{i \in DISKS(s)} PSVU(DSVR(i), w) \cdot F(s, d, w) \cdot BD(i, j, w)}.$$

The weighted SISD for the destination NICS is:
$\forall d \, \forall j \in NICS(d) \, \forall w$.

$$SIDN(j, w) = \frac{\sum_{s=1}^{C1} \sum_{i \in NICS(s)} SIDN(j, w) \cdot PSVU(NSVR(i), w) \cdot F(s, d, w) \cdot BN(i, j, w)}{\sum_{s=1}^{C1} \sum_{i \in NICS(s)} PSVU(NSVR(i), w) \cdot F(s, d, w) \cdot BN(i, j, w)}.$$

There is one exception to this rule for network transmission devices. The visit count is multiplied by the number of messages, then by factor of 2 (two) if the network is full-duplex. Note that networks are not subject to relocation.

$$DUPLEX(t) = \begin{cases} 2 & \text{if network } t \text{ is } fullduplex \\ 1 & \text{otherwise} \end{cases}$$

$$DVCD(k, w) = \frac{DUPLEX(t) * MC(t)}{DD(k) * SD(t)}.$$

In step 590 of the transformation method, new service demands estimates for servers, devices and network transmission delays for the destination data center scenario are computed according to the following paragraphs.

The arrival rate, relative throughput and throughput for the CPU device on server t during interval p are calculated as shown in the equations below. Because most variables always change with each interval, the subscript p is omitted in the remainder of the document.

$$A(w) \equiv A(w, p) = AB(w) * G(w, p);$$

$$A(0) = \sum_{w=1}^{W} A(w);$$

$$Y(t, w) = (A(w)/A(0)) * SVCD(t, w); \text{ and}$$

$$Y(t, 0) = \sum_{w=1}^{W} Y(t, w).$$

where $Y(t,w)$ is the relative throughput of server t for workload w and $Y(t,0)$ is the overall throughput for server t. New service demands are calculated for CPU's as follows:

$$PDC(t, w) = SIDC(t, w)/CS(t); \text{ and}$$

$$PDC(t, 0) = \frac{\left(\sum_{w=1}^{W} Y(t, w) * PDC(t, w)\right)}{Y(t, 0)}.$$

The disk throughputs are computed as:

$$Y'(k, w) = (A(w)/A(0)) * DVCD(k, w); \text{ and}$$

$$Y'(k, 0) = \sum_{w=1}^{W} Y'(k, w).$$

where $Y'(k,w)$ is the relative throughput of device k for workload w and $Y'(k,0)$ is the overall throughput for device k. Disks are modeled as a fixed-rate service center. New disk service demands are calculated as follows:

$$PDD(k, w) = SIDD(k, w)/DS(k); \text{ and}$$

$$PDD(k, 0) = \frac{\left(\sum_{w=1}^{W} Y'(k, w) * PDD(k, w)\right)}{Y'(k, 0)}.$$

NICs are also modeled as fixed-rate service centers and utilize the same basic formula.

In the preferred embodiment of the present invention, network transmission devices are implemented as load-dependent service centers, as are CPU's. Instead of the number of processors, the degree of concurrency is determined by the number of streams. The number of streams is doubled if the network is full duplex.

A network delay device imposes a fixed delay on every message, regardless of the number of transactions. The response time R is an input as has been described. The service demand is the same as the response time $$PDL(n, w) = R(n, w) \cdot DVCD(n, w); \text{ and}$$

$$PDL_d(n, 0) = \frac{\left(\sum_{w=1}^{W} Y(t, w) * PDL(n, w)\right)}{Y(t, 0)}.$$

A network transmission device is modeled as fixed-rate queuing center in the same way as Disk and NIC devices. However, because it is characterized by slightly different input parameters, there is a unique formula to calculate its utilization and service demand $$UMT(n, w) = \frac{UDR(n, w)}{TS(n)}; \text{ and}$$

$$PDT(n, w) = \frac{UDR(n, w) * SC(n)}{DVCD(n, w)}.$$

In step 600 of the transformation method of the preferred embodiment of the present invention, memory service demand and consumption for the destination data center scenario is computed according to the following discussion.

In general, values of the memory demand can vary between servers. For workload reassignment, the weighted demand is calculated in the same way as device service demands:

$$\forall d \forall w PDM(d, w) = \frac{\sum_{s=1}^{C1} PDM(s, w) \cdot SFM(s, d, w) \cdot F(s, d, w)}{\sum_{s=1}^{C1} F(s, d, w)}.$$

Note that the memory service demand PDM(s,w) is scaled by SFM(s,d,w) to adjust for server-specific differences in memory consumption.

It is also convenient to define the function G(d,w) to indicate if workload w is present on (destination) server d after relocation:

$$G(d, w) \equiv 1 \text{ if } \sum_{s=1}^{s=C1} F(s, d, w) > 0; \text{ and}$$

$$G(d, w) \equiv 0 \text{ if } \sum_{s=1}^{s=C1} F(s, d, w) = 0.$$

The sum of core and fixed workload memory requirements on server d after relocation are:

$$MCORE(d) + \sum_{w=1}^{W} MFIXED(d, w) * G(d, w).$$

The dynamic memory requirement for workload w on server d is simply the product of the throughput and weighted average memory demand $$MDYN(d,w) = TPUT(d,w) * PDM(d,w).$$

Thus the total projected memory consumption on destination server d is:

$$MP(d) = MCORE(d) + \sum_{w=1}^{W} (MFIXED(d, w) * G(d, w) + TPUT(d, w) * PDM(d, w)).$$

The total and dynamic memory utilizations for the destination servers in the destination data center scenario are, respectively:

$$UMM(d) = \frac{MP(d)}{MC(d)}; \text{ and}$$

$$DMWU(d, w) = \frac{TPUT(d, w) * PDM(d, w)}{MC(d)}.$$

Step 610 of the transformation method 500 takes the output of the previous steps along with the base configuration parameters contained in source data center 230 and computes standard outputs of a standard queuing theory solver known in the art and described in section 3.6 of the reference work, Computer Performance Modeling Handbook [Stephen S. Lavenburg, Academic Press, 1983]. These standard outputs include throughputs, utilizations, populations (means and distributions) and mean response times for each device for each workload and become the New Performance Results 265 of FIG. 3 and are displayed as requested by the Data Center Modeling Wizard 210.

Modeling engine 260 implements the standard queuing theory solver so described to compute the standard outputs. The outputs can be aggregated to represent arrays of devices, servers or arrays of servers, networks and end-to-end (all devices, servers and networks)—for each workload and for all workloads together. The response times can be reported as relative response times (relative to a baseline configuration and reporting period), uncalibrated response times (the standard response times computed by standard queuing network solvers) and calibrated response times (calibrated by user-specified known response times). The outputs can be displayed via text, tables, and charts of various kinds.

A representative example of the output of modeling engine 260 is a set of relative utilizations for a particular workload displayed as a graph of relative utilization versus time interval p. Those skilled in the art will understand the many other performance metrics that model engine 260 will generate and how those metrics are normally displayed.

Example 1

Server Consolidation Example

Consolidate 2 Servers to 1

Assume 3 servers. ServerA has 2 disks (a1 and a2) and one NIC (a1). ServerB has one disk (b1) and two NICS (b1 and b2). ServerC has three disks (c1,c2,c3) and two NICs (c1,c2)

| t | server | ND(t) | DISKS(t) | NN(t) | NICS(t) |
|---|--------|-------|----------|-------|---------|
| 1 | ServerA | 2 | 1, 2 | 1 | 1 |
| 2 | ServerB | 1 | 3 | 2 | 2, 3 |
| 3 | ServerC | 3 | 4, 5, 6 | 2 | 4, 5 |

| k | server | disk | DSVR(k) |
|---|--------|------|---------|
| 1 | ServerA | A1 | 1 |
| 2 | ServerA | A2 | 1 |
| 3 | ServerB | B1 | 2 |
| 4 | ServerC | C1 | 3 |
| 5 | ServerC | C2 | 3 |
| 6 | ServerC | C3 | 3 |

| K | Server | NIC | NSVR(k) |
|---|--------|-----|---------|
| 1 | ServerA | A1 | 1 |
| 2 | ServerB | B1 | 2 |
| 3 | ServerB | B2 | 2 |
| 4 | ServerC | C1 | 3 |
| 5 | ServerC | C2 | 3 |

To consolidate the work on serverA and serverB to ServerC, the Capacity Manager user:
1. Creates a new Server Consolidation scenario.
2. Creates a new Reassignment
3. Chooses ServerA and ServerB on the "Choose source server" screen
4. Chooses ServerC on the "Choose destination servers" screen Server consolidation affects all workloads, so for any workload
F(1,3,w)=1 (A to C)
F(2,3,w)=1 (B to C)
F(3,3,w)=1 (work on C stays put)
All other values of F are zero.

Capacity manager implicitly relocates work on peripherals uniformly, so it does not prompt the user for values of BD and BN. Again, all workloads are affected equally.

In this case, the following values of BD are generated
BD(1,4,w)=⅓ (spread work on disk A1 evenly to the three disks on ServerC)
BD(1,5,w)=⅓
BD(1,6,w)=⅓
BD(2,4,w)=⅓ (spread work on disk A2)
BD(2,5,w)=⅓
BD(2,6,w)=⅓
BD(3,4,w)=⅓
BD(3,5,w)=⅓
BD(3,6,w)=⅓
BD(4,4,w)=1 (work on server C disks stays put)
BD(5,5,w)=1
BD(6,6,w)=1
The approach for NIC's is similar
BN(1,4,w)=½
BN(1,5,w)=½
BN(2,4,w)=½
BN(2,5,w)=½
BN(3,4,w)=½
BN(3,5,w)=½
BN(4,4,w)=1
BN(5,5,w)=1

Example 2

Workload Reassignment Example

In the above example, assume two workloads "Sales" (w=1) and "Inventory" (w=2). The Capacity Manager user wishes to model the effects of moving 60% of the Sales from Server C to ServerA, while moving 40% of Inventory from ServerC to ServerB.

The sequence of steps from the GUI is:
1. Create a Workload Reassignment Scenario
2. Create a reassignment with the "Specify reassignment details" screen
3. Call the first reassignment "move Sales"
4. Select "Sales" workload on the "Select workload to reassign" screen
5. Select ServerC as the source server on "Select source server" screen
6. Enter a value of 60% in the reassignment column for "ServerC" on the "Select Work to Reassign" screen
7. Select Server A as the destination server on the "Select destination servers" screen
8. Create a second reassignment called "Move inventory" with the "specify reassignment details" screen.
9. Select "Inventory" workload on the "Select workload to reassign" screen
10. Select ServerC as the source server on "Select source server" screen
11. Enter a value of 40% in the reassignment column for "ServerC" on the "Select Work to Reassign" screen
12. Select ServerB as the destination server on the "Select destination servers" screen The values of the F matrix in this case are:
F(1,1,1)=1 (Sales work on ServerA stays put)
F(1,1,2)=1 (Inventory work on Server A stays put)
F(2,2,1)=1 (Sales on ServerB stays put)
F(2,2,2)=1 (Inventory on ServerB stays put)
F(3,1,1)=0.6 (move 60% of Sales from C to A)
F(3,3,1)=0.4 (leave 40% of Sales on C)
F(3,2,2)=0.4 (move 40% of Inventory from C to B)
F(3,3,2)=0.6 (leave 60% of Inventory on C)
All other values of F are zero.

As with server consolidation, relocation is applied uniformly to disks and NIC's
BD(1,1,1)=1
BD(1,1,2)=1
BD(2,1,1)=1
BD(2,2,2)=1
BD(3,3,1)=1
BD(3,3,2)=1
BD(4,1,1)=½ (spread relocated work evenly)
BD(4,2,1)=½
BD(4,4,1)=1
BD(5,1,1)=½
BD(5,2,1)=½
BD(5,5,1)=1
BD(6,1,1)=½
BD(6,2,1)=½
BD(6,6,1)=1
BD(4,3,2)=1 (only one disk on server B)
BD(4,4,2)=1
BD(5,3,2)=1
BD(5,5,2)=1
BD(6,3,2)=1
BD(6,6,20=1
All other values of BD are zero.
For the NIC activity
BN(1,1,1)=1
BN(2,2,1)=1
BN(3,3,1)=1
BN(4,1,1)=1 (only one NIC on ServerA)
BN(4,4,1)=1
BN(5,1,1)=1
BN(5,5,1)=1
BN(1,1,2)=1
BN(2,2,2)=1
BN(3,3,2)=1
BN(4,2,2)=½ (spread Inventory activity evenly across ServerB NIC's)
BN(4,3,2)=½
BN(4,4,2)=1
BN(5,2,2)=½
BN(5,3,2)=½
BN(5,5,2)=1

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method of capacity planning for server migration from a first server system characterized by a source configuration comprising a set of source parameters, an original set of workloads and a set of service demands associated to a set of devices, to a second server system, the method comprising:
specifying a destination configuration of the second server system;

transforming the set of source parameters into a set of destination parameters for the destination configuration by scaling a service demand in the set of service demands into a speed independent service demand parameter according to:
  choosing a speed benchmark parameter associated with a device in the set of devices, and
  multiplying the speed benchmark parameter by the service demand to arrive at the speed independent service demand parameter; and
deriving a performance model for the destination configuration based on the set of destination parameters and the speed independent service demand parameter.

2. The method of claim 1 wherein specifying a destination configuration further comprises:
  consolidating a set of source server in the first server system into a set of destination servers in the second server system;
  reassigning a workload in the original set of workloads to the set of destination servers;
  changing a source server configuration into a destination server configuration; and
  scaling the workload.

3. The method of claim 2 wherein consolidating a set of source server further comprises:
  defining a destination data center scenario; and,
  selecting a new workload reassignment from a list of premises defined reassignments.

4. The method of claim 2 wherein reassigning a workload comprises:
  defining a destination data center scenario;
  choosing a first workload to reassign from a first server; and
  reassigning the first workload to a second server according to the destination data center scenario.

5. The method of claim 1 further comprising assigning a single server as a source server and a destination server.

6. The method of claim 1 wherein transforming comprises:
  selecting a desired number of CPUs in the destination configuration; and,
  adjusting a performance parameter according to the desired number of CPUs.

7. The method of claim 1 wherein transforming comprises calculating an increased memory usage as a result of a workload change.

8. The method of claim 1 wherein specifying a destination configuration further comprises specifying a thread level parallelism.

9. The method of claim 1 wherein specifying a destination configuration further comprises:
  facilitating the selection of a source server from the first server system in a graphical user interface; and
  facilitating the selection of a destination server for the second server system in the graphical user interface.

10. The method of claim 9 wherein specifying a destination configuration further comprises:
  facilitating the specification of an attached device for the destination server in the graphical user interface; and,
  facilitating the specification of a threshold profile for the attached device in the graphical user interface.

11. The method of claim 10 wherein facilitating the specification of an attached device further comprises changing one of:
  a CPU device from the source configuration;
  a memory configuration from the source configuration;
  a disk drive device from the source configuration; and
  a network interface device from the source configuration.

12. The method of claim 1 wherein choosing a speed benchmark parameter includes choosing a CPU SPEC rating as the speed benchmark parameter.

* * * * *